(12) United States Patent
Zhang et al.

(10) Patent No.: US 11,888,959 B2
(45) Date of Patent: Jan. 30, 2024

(54) DATA TRANSMISSION METHOD, SYSTEM, DEVICE, AND STORAGE MEDIUM

(71) Applicant: Huawei Technologies Co., Ltd., Shenzhen (CN)

(72) Inventors: Yongkang Zhang, Nanjing (CN); Yi Qin, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 50 days.

(21) Appl. No.: 17/848,534

(22) Filed: Jun. 24, 2022

(65) Prior Publication Data
US 2022/0417348 A1 Dec. 29, 2022

(30) Foreign Application Priority Data
Jun. 25, 2021 (CN) .......................... 202110710220.3

(51) Int. Cl.
*H04L 69/164* (2022.01)
*H04L 67/141* (2022.01)
*H04L 67/146* (2022.01)
*H04L 69/18* (2022.01)

(52) U.S. Cl.
CPC .......... *H04L 69/164* (2013.01); *H04L 67/141* (2013.01); *H04L 67/146* (2013.01); *H04L 69/18* (2013.01)

(58) Field of Classification Search
CPC ... H04L 69/164; H04L 67/141; H04L 67/146; H04L 69/18; H04L 67/10; H04L 69/14; H04L 67/14; H04L 69/26
See application file for complete search history.

(56) References Cited

U.S. PATENT DOCUMENTS

| | | | |
|---|---|---|---|
| 2016/0330245 A1* | 11/2016 | Bell | H04L 63/0823 |
| 2016/0380984 A1* | 12/2016 | Johnson | H04L 63/0485 |
| | | | 713/153 |
| 2018/0314476 A1* | 11/2018 | Zinchenko | G06F 3/1231 |
| 2020/0358886 A1 | 11/2020 | Wei et al. | |
| 2020/0359264 A1 | 11/2020 | Racz et al. | |
| 2021/0409335 A1* | 12/2021 | Zhu | H04L 47/24 |
| 2022/0078103 A1* | 3/2022 | Prajapat | H04L 12/1877 |

OTHER PUBLICATIONS

Q. An et al, Multipath Extension for QUIC, draft-an-multipath-quic-00, Oct. 22, 2020, 22 pages.
S. Dawkins, Ed., Questions for Multiple Paths In QUIC, draft-dawkins-quic-multipath-questions-01, Jan. 17, 2021, 15 pages.
(Continued)

*Primary Examiner* — Michael A Keller
*Assistant Examiner* — Thao D Duong
(74) *Attorney, Agent, or Firm* — Conley Rose, P.C.

(57) ABSTRACT

A data transmission method includes establishing, by a first apparatus in a distributed system, a connection to a target end; sending, by the first apparatus, connection information of the connection to a second apparatus that is in the distributed system and that transmits data to the target end; transmitting, by the second apparatus, the data to the target end based on the connection information and using a stream of the connection.

19 Claims, 15 Drawing Sheets

(56) References Cited

OTHER PUBLICATIONS

S. Dawkins, Ed., What To Do With Multiple Active Paths in QUIC, draft-dawkins-quic-what-to-do-with-multipath-03, Jan. 6, 2021, 14 pages.
Q. De Coninck et al, Multipath Extensions for QUIC (MP-QUIC), draft-deconinck-quic-multipath-07, May 3, 2021, 36 pages.
C. Huitema, QUIC Multipath Negotiation Option, draft-huitema-quic-mpath-option-01, Sep. 12, 2021, 10 pages.
G. Zheng et al., UDP based Publication Channel for Streaming Telemetry, draft-ietf-netconf-udp-pub-channel-05, Mar. 11, 2019, 21 pages.
H. Song et al, Network Telemetry Framework, draft-ietf-opsawg-ntf-07, Feb. 19, 2021, 38 pages.
Y. Liu et al, Multipath Extension for QUIC, draft-liu-multipath-quic-04, Sep. 5, 2021, 22 pages.
Request For Comments: 826, David C. Plummer, An Ethernet Address Resolution Protocol—or—Converting Network Protocol Addresses to 48.bit Ethernet Address for Transmission on Ethernet Hardware, Network Working Group, Nov. 1982, 10 pages.
Request for Comments: 4193, R. Hinden et al., Unique Local IPv6 Unicast Addresses, Network Working Group, Oct. 2005, 16 pages.
Request for Comments: 4271, Y. Rekhter, Ed. et al, A Border Gateway Protocol 4 (BGP-4), Network Working Group, Jan. 2006, 104 pages.
Request for Comments: 4291, R. Hinden et al, IP Version 6 Addressing Architecture, Network Working Group, Feb. 2006, 25 pages.
Request for Comments: 4861, T. Narten et al, Neighbor Discovery for IP version 6 (IPv6), Network Working Group, Sep. 2007, 97 pages.
Request for Comments: 4862, S. Thomson et al, IPv6 Stateless Address Autoconfiguration, Network Working Group, Sep. 2007, 30 pages.
Request for Comments: 6724, D. Thaler, Ed et al, Default Address Selection for Internet Protocol Version 6 (IPv6), Internet Engineering Task Force (IETF), Sep. 2012, 32 pages.
Request for Comments: 6793, Q. Vohra et al, BGP Support for Four-Octet Autonomous System (AS) Number Space, Internet Engineering Task Force (IETF), Dec. 2012, 12 pages.
Request for Comments: 7301, S. Friedl et al, Transport Layer Security (TLS) Application-Layer Protocol Negotiation Extension, Internet Engineering Task Force (IETF), Jul. 2014, 9 pages.
Request for Comments: 7404, M. Behringer et al, Using Only Link-Local Addressing inside an IPV6 Network, Internet Engineering Task Force (IETF), Nov. 2014, 10 pages.
Request for Comments: 7938, P. Lapukhov et al, Use of BGP for Routing in Large-Scale Data Centers, Internet Engineering Task Force (IETF), Aug. 2016, 35 pages.
Request for Comments: 8446, E. Rescorla, The Transport Layer Security (TLS) Protocol Version 1.3, Internet Engineering Task Force (IETF), Aug. 2018, 160 pages.
RFC 9000, J. Iyengar, Ed. et al, QUIC: A UDP-Based Multiplexed and Secure Transport, Internet Engineering Task Force (IETF), May 2021, 151 pages.
RFC 9001, M. Thomson, Ed. et al, Using TLS to Secure QUIC, Internet Engineering Task Force (IETF), May 2021, 52 pages.
RFC 9002, J. Iyengar, Ed. et al, QUIC Loss Detection and Congestion Control, Internet Engineering Task Force (IETF), May 2021, 42 pages.

\* cited by examiner

DATA TRANSMISSION METHOD, SYSTEM, DEVICE, AND STORAGE MEDIUM

CROSS-REFERENCE TO RELATED APPLICATIONS

This application claims priority to Chinese Patent Application No. 202110710220.3, filed on Jun. 25, 2021, which is hereby incorporated by reference in its entirety.

TECHNICAL FIELD

This application relates to the field of communications technologies, and in particular, to a data transmission method, system, and device, and a storage medium.

BACKGROUND

To improve high concurrency of data transmission, a distributed system emerges. The distributed system includes a plurality of nodes, and the nodes communicate with a data receiving end in parallel, to implement high concurrency. The plurality of nodes in the distributed system are externally presented as a single logical device. The plurality of nodes includes a master node and a slave node, and the master node is used to manage the slave node.

In a related technology, when each node in the distributed system communicates with the data receiving end, a transport protocol used for communication between the master node and the data receiving end is different from a transport protocol used for communication between the slave node and the data receiving end. For example, a network device has a distributed architecture, including a main board (MB) and two line cards (LCs). The MB is a master node, and the LC is a slave node. The MB uses the GOOGLE Remote Procedure Call Protocol (gRPC) as a transport protocol. To establish fewer Transmission Control Protocol (TCP) connections, the LC uses the User Datagram Protocol (UDP) as a transport protocol. In this way, a plurality of sets of transport protocols are used in the distributed system for implementation, causing relatively high implementation and maintenance complexity.

SUMMARY

This application provides a data transmission method, system, and device, and a storage medium, to reduce implementation and maintenance complexity of a distributed system.

According to a first aspect, this application provides a data transmission method, applied to a first apparatus in a distributed system. The distributed system includes the first apparatus and M second apparatuses, and the method includes sending connection information of a target connection to each of N second apparatuses in the M second apparatuses, so that each of the N second apparatuses transmits data to a target end by using at least one stream of the target connection, where the target connection is a target transport protocol-based connection, the target connection is a connection established between the first apparatus and the target end, the connection information is used to indicate a parameter required for data transmission, both M and N are positive integers greater than or equal to 1, and N is less than or equal to M.

In this solution shown in this application, the data transmission method is applied to the first apparatus in the distributed system, and the distributed system includes the first apparatus and the M second apparatuses. The first apparatus establishes the target connection to the target end, and the target connection is the target transport protocol-based connection. The M second apparatuses include the N second apparatuses. The first apparatus sends the connection information of the target connection to each of the N second apparatuses, and the connection information is used to indicate the parameter required for data transmission performed through the target connection. Each of the N second apparatuses transmits the data to the target end by using the at least one stream of the target connection. In this way, only the first apparatus in the distributed system establishes the target connection to the target end, and each of the N second apparatuses transmits the data to the target end through the target connection, that is, through one set of transport protocol. Therefore, implementation and maintenance complexity of data transmission can be reduced.

In a possible implementation, before the sending connection information of a target connection to each of N second apparatuses in the M second apparatuses, the method further includes that the first apparatus initiates establishment of the target connection to the target end.

In a possible implementation, a target transport protocol is a QUIC protocol.

In a possible implementation, the method further includes sending an application identity to each of the N second apparatuses, where the application identity is used to indicate each of the N second apparatuses to determine the to-be-transmitted data. In this way, the second apparatus can be indicated to determine the to-be-transmitted data.

In a possible implementation, the method further includes sending an application identity corresponding to the at least one stream to the target end. In this way, the target end can provide, for a corresponding application, the data transmitted by using the at least one stream.

In a possible implementation, the at least one stream carries the application identity corresponding to the transmitted data. In this way, the target end can provide, for a corresponding application, the data transmitted by using the at least one stream.

In a possible implementation, the method further includes transmitting data to the target end based on the connection information of the target connection by using a target stream of the target connection. In this way, the first apparatus can also transmit the data to the target end through the target connection.

In a possible implementation, the at least one stream is different from the target stream, and the N second apparatuses use different streams. In this way, the first apparatus and each of the N second apparatuses transmit data by using different streams, to facilitate flow control, congestion control, and the like, so that the target end can distinguish between the data transmitted by using the different streams.

In a possible implementation, the first apparatus and each of the N second apparatuses transmit data to the target end by using a same path. It indicates that the first apparatus and each of the N second apparatuses transmit the data by using a same quintuple. Alternatively, at least two apparatuses in the distributed system transmit data to the target end by using different paths. It indicates that the at least two apparatuses transmit the data by using different quintuples. The at least two apparatuses belong to the first apparatus and the N second apparatuses.

In a possible implementation, the first apparatus and each of the N second apparatuses transmit data to the target end by using a same path, and the method further includes receiving a response packet sent by the target end, where the response packet is a packet returned by the target end based on a target data receiving status; and sending, based on a stream identity in the response packet, the response packet to a second apparatus to which target data belongs.

In this solution shown in this application, the first apparatus and each of the N second apparatuses transmit the data to the target end on the same path, the response packet sent by the target end is sent to the first apparatus, and the first apparatus provides, based on the stream identity in the response packet, the response packet for the second apparatus to which the target data belongs. In this way, because the first apparatus and the second apparatus use the same path, that is, the same quintuple, Internet Protocol (IP) address and port number resources can be saved.

According to a second aspect, this application provides a data transmission method, applied to a second apparatus in a distributed system. The distributed system includes a first apparatus and the second apparatus, and the method includes receiving connection information of a target connection that is sent by the first apparatus, where the target connection is a target transport protocol-based connection, the target connection is a connection established between the first apparatus and a target end, the connection information is used to indicate a parameter required for data transmission, and at least one stream of the target connection is used by an apparatus that is in the distributed system and that has the connection information to transmit data to the target end; and transmitting data to the target end based on the connection information by using the stream of the target connection.

In this solution shown in this application, the second apparatus in the distributed system receives the connection information of the target connection that is sent by the first apparatus. When the second apparatus needs to transmit the data to the target end, the second apparatus transmits the data to the target end by using the stream of the target connection. The at least one stream of the target connection is used by the apparatus that is in the distributed system and that has the connection information to transmit the data to the target end, so that the apparatus that is in the distributed system and that has the connection information transmits the data to the target end through the target connection. This can reduce implementation and maintenance complexity of data transmission.

In a possible implementation, the method further includes receiving an application identity sent by the first apparatus; and determining the to-be-transmitted data based on the received application identity. In this way, the second apparatus can transmit the specified data according to the instruction of the first apparatus.

In a possible implementation, the method further includes receiving an identity range of the stream that is sent by the first apparatus; and determining a stream identity based on the identity range, where different streams correspond to different identity ranges, and the stream identity is carried in the stream. In this way, different second apparatuses can use different streams.

According to a third aspect, this application provides a data transmission method, applied to a distributed system. The distributed system includes a first apparatus and M second apparatuses, and the method includes that the first apparatus sends connection information of a target connection to each of N second apparatuses in the M second apparatuses, where the target connection is a target transport protocol-based connection, the target connection is a connection established between the first apparatus and a target end, the connection information is used to indicate a parameter required for data transmission, both M and N are positive integers greater than or equal to 1, and N is less than or equal to M. Each of the N second apparatuses transmits data to the target end based on the connection information by using at least one stream of the target connection.

According to a fourth aspect, this application provides a data transmission method, applied to a target end to which a distributed system transmits data. The distributed system includes a first apparatus and M second apparatuses, and the method includes receiving data transmitted by each of N second apparatuses in the M second apparatuses by using at least one stream of a target connection, where both M and N are positive integers greater than or equal to 1, N is less than or equal to M, the target connection is a target transport protocol-based connection, and the target connection is a connection established between the first apparatus and the target end; and providing the data for an application to which the data belongs.

In this solution shown in this application, when the distributed system transmits the data to the target end, the target end receives the data transmitted by each of the N second apparatuses in the distributed system by using the at least one stream of the target connection. In this way, in the distributed system, the first apparatus establishes the target connection to the target end, and there is no need that each second apparatus establishes a connection to the target end. Therefore, processing logic of the target end can be simplified, and implementation and maintenance complexity of data transmission can be reduced.

In a possible implementation, the method further includes establishing the target connection to the first apparatus based on a connection request initiated by the first apparatus for the target connection; or initiating establishment of the target connection to the first apparatus. In this way, when the distributed system establishes the target connection to the target end, the establishment may be initiated by the first apparatus or the target end. This improves connection establishment flexibility.

In a possible implementation, the method further includes establishing a binding relationship between an application of the target end and each of an IP address and a UDP port of the target end, where the IP address and the UDP port of the target end are used to establish the target connection to the first apparatus; and the providing the data for an application to which the data belongs includes providing, for the application to which the data belongs based on the IP address and the UDP port, the data sent by each of the N second apparatuses.

In this solution shown in this application, the target end may establish the binding relationship between the application and each of the IP address and the UDP port, to indicate that the application can receive the data from the IP address and the UDP port. In this way, the target end may provide, for the application to which the data belongs based on the IP address and the UDP port, the data sent by each of the N second apparatuses.

In a possible implementation, different applications of the target end correspond to different application identities, and the providing, for the application to which the data belongs, the data sent by each of the N second apparatuses includes providing, for the application to which the data belongs based on an application identity corresponding to the data sent by each of the N second apparatuses, the data sent by each of the N second apparatuses.

In this solution shown in this application, different applications correspond to different application identities, and the target end can provide, for the application to which the data belongs based on the application identity corresponding to the data sent by each of the N second apparatuses, the data sent by each of the N second apparatuses. In this way, the application can obtain the data that belongs to the application.

According to a fifth aspect, this application provides a data transmission apparatus. The data transmission apparatus is applied to a first apparatus in a distributed system, the distributed system includes the first apparatus and M second apparatuses, and the data transmission apparatus includes a transmission module, configured to send connection information of a target connection to each of N second apparatuses in the M second apparatuses, so that each of the N second apparatuses transmits data to a target end by using at least one stream of the target connection, where the target connection is a target transport protocol-based connection, the target connection is a connection established between the first apparatus and the target end, the connection information is used to indicate a parameter required for data transmission, both M and N are positive integers greater than or equal to 1, and N is less than or equal to M.

In a possible implementation, the data transmission apparatus further includes an establishment module, and the establishment module is configured to initiate establishment of the target connection to the target end before the connection information of the target connection is sent to each of the N second apparatuses in the M second apparatuses.

In a possible implementation, a target transport protocol is a QUIC protocol.

In a possible implementation, the transmission module is further configured to send an application identity to each of the N second apparatuses, where the application identity is used to indicate each of the N second apparatuses to determine the to-be-transmitted data.

In a possible implementation, the transmission module is further configured to send an application identity corresponding to the at least one stream to the target end.

In a possible implementation, the at least one stream carries the application identity corresponding to the transmitted data.

In a possible implementation, the transmission module is further configured to transmit data to the target end based on the connection information by using a target stream of the target connection.

In a possible implementation, the at least one stream is different from the target stream, and the N second apparatuses use different streams.

In a possible implementation, the first apparatus and each of the N second apparatuses transmit data to the target end by using a same path; or at least two apparatuses in the distributed system transmit data to the target end by using different paths, where the at least two apparatuses belong to the first apparatus and the N second apparatuses.

In a possible implementation, the first apparatus and each of the N second apparatuses transmit data to the target end by using a same path, and the transmission module is further configured to receive a response packet sent by the target end, where the response packet is a packet returned by the target end based on a target data receiving status; and send, based on a stream identity in the response packet, the response packet to a second apparatus to which target data belongs.

According to a sixth aspect, this application provides a data transmission apparatus. The data transmission apparatus is applied to a second apparatus in a distributed system, the distributed system includes a first apparatus and the second apparatus, and the data transmission apparatus includes a receiving module, configured to receive connection information of a target connection that is sent by the first apparatus, where the target connection is a target transport protocol-based connection, the target connection is a connection established between the first apparatus and a target end, and the connection information is used to indicate a parameter required for data transmission; and a transmission module, configured to transmit data to the target end based on the connection information by using a stream of the target connection, where the at least one stream of the target connection is used by an apparatus that is in the distributed system and that receives the connection information to transmit data to the target end.

In a possible implementation, the transmission module is further configured to receive an application identity sent by the first apparatus; and determine the to-be-transmitted data based on the received application identity.

In a possible implementation, the transmission module is further configured to receive an identity range of the stream that is sent by the first apparatus; and determine a stream identity based on the identity range, where different streams correspond to different identity ranges, and the stream identity is carried in the stream.

According to a seventh aspect, this application provides a data transmission apparatus. The data transmission apparatus is applied to a target end to which a distributed system transmits data, the distributed system includes a first apparatus and M second apparatuses, and the data transmission apparatus includes a transmission module, configured to receive data transmitted by each of N second apparatuses in the M second apparatuses by using at least one stream of a target connection, where both M and N are positive integers greater than or equal to 1, N is less than or equal to M, the target connection is a target transport protocol-based connection, and the target connection is a connection established between the first apparatus and the target end; and a provision module, configured to provide the data for an application to which the data belongs.

In a possible implementation, the data transmission apparatus further includes an establishment module, configured to establish the target connection to the first apparatus based on a connection request initiated by the first apparatus for the target connection; or initiate establishment of the target connection to the first apparatus.

In a possible implementation, the establishment module is further configured to establish a binding relationship between an application of the target end and each of an IP address and a UDP port of the target end, where the IP address and the UDP port of the target end are used to establish the target connection to the first apparatus; and the provision module is further configured to provide, for the application to which the data belongs based on the IP address and the UDP port, the data sent by each of the N second apparatuses.

In a possible implementation, different applications of the target end correspond to different application identities, and the provision module is configured to provide, for the application to which the data belongs based on an application identity corresponding to the data sent by each of the N second apparatuses, the data sent by each of the N second apparatuses.

In some embodiments, the modules in the data transmission apparatus are implemented by software, and are program modules. In some other embodiments, the modules in the data transmission apparatus are implemented by hardware or firmware.

According to an eighth aspect, this application provides a data transmission device. The data transmission device includes a network interface, a memory, and a processor connected to the memory. The network interface is configured to send information about a target connection to each of N second apparatuses.

The memory is configured to store program instructions. The processor is configured to execute the program instructions, so that the data transmission device is configured to implement the data transmission method provided in any one of the first aspect or the optional manners of the first aspect.

According to a ninth aspect, this application provides a data transmission device. The data transmission device includes a network interface, a memory, and a processor connected to the memory. The network interface is configured to receive connection information of a target connection that is sent by a first apparatus.

The memory is configured to store program instructions. The processor is configured to execute the program instructions, so that the data transmission device is configured to implement the data transmission method provided in any one of the second aspect or the optional manners of the second aspect.

According to a tenth aspect, this application provides a data transmission device. The data transmission device includes a network interface, a memory, and a processor connected to the memory. The network interface is configured to receive data send by each of N second apparatuses.

The memory is configured to store program instructions. The processor is configured to execute the program instructions, so that the data transmission device is configured to implement the data transmission method provided in any one of the fourth aspect or the optional manners of the fourth aspect.

According to an eleventh aspect, this application provides a computer-readable storage medium. The storage medium stores at least one instruction, and the instruction is read by a processor, so that a data transmission device implements the data transmission method provided in any one of the first aspect or the optional manners of the first aspect.

According to a twelfth aspect, this application provides a computer-readable storage medium. The storage medium stores at least one instruction, and the instruction is read by a processor, so that a data transmission device implements the data transmission method provided in any one of the second aspect or the optional manners of the second aspect.

According to a thirteenth aspect, this application provides a computer-readable storage medium. The storage medium stores at least one instruction, and the instruction is read by a processor, so that a data transmission device implements the data transmission method provided in any one of the fourth aspect or the optional manners of the fourth aspect.

According to a fourteenth aspect, this application provides a computer program product. The computer program product includes computer instructions, and the computer instructions are stored in a computer-readable storage medium. A processor of a data transmission device reads the computer instructions from the computer-readable storage medium, and executes the computer instructions, so that the data transmission device implements the data transmission method provided in any one of the first aspect or the optional manners of the first aspect.

According to a fifteenth aspect, this application provides a computer program product. The computer program product includes computer instructions, and the computer instructions are stored in a computer-readable storage medium. A processor of a data transmission device reads the computer instructions from the computer-readable storage medium, and executes the computer instructions, so that the data transmission device implements the data transmission method provided in any one of the second aspect or the optional manners of the second aspect.

According to a sixteenth aspect, this application provides a computer program product. The computer program product includes computer instructions, and the computer instructions are stored in a computer-readable storage medium. A processor of a data transmission device reads the computer instructions from the computer-readable storage medium, and executes the computer instructions, so that the data transmission device implements the data transmission method provided in any one of the fourth aspect or the optional manners of the fourth aspect.

According to a seventeenth aspect, this application provides a data transmission system. The data transmission system includes a first apparatus, a second apparatus, and a target end. The first apparatus is configured to implement the data transmission method provided in any one of the first aspect or the optional manners of the first aspect. The second apparatus is configured to implement the data transmission method provided in any one of the second aspect or the optional manners of the second aspect. The target end is configured to implement the data transmission method provided in any one of the fourth aspect or the optional manners of the fourth aspect.

DESCRIPTION OF EMBODIMENTS

To make objectives, technical solutions, and advantages of this application clearer, the following further describes implementations of this application in detail with reference to accompanying drawings.

The following describes some terms and concepts in embodiments of this application.

Figure 1:
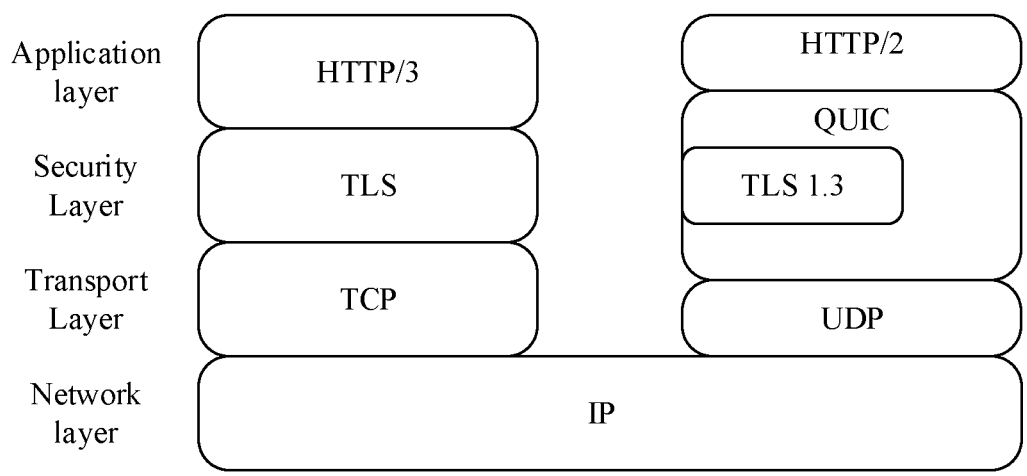
FIG. 1 is a schematic diagram of a format of a QUIC protocol stack according to an example embodiment of this application.

(1) QUIC is a reliable UDP-based secure transport protocol. (QUIC is a name and not an acronym). For details, refer to the request for comments (RFC) 9000. FIG. 1 shows a QUIC protocol stack. QUIC is run above the UDP, is highly integrated with the Transport Layer Security (TLS) 1.3, and provides TCP-like functions such as reliability and congestion control. On the left of FIG. 1, a conventional Hypertext Transfer Protocol (HTTP) protocol stack is shown, and includes HTTP/3, TLS, and TCP from top to bottom. On the right of FIG. 1, a QUIC protocol stack is shown, and includes HTTP/3, QUIC, and UDP from top to bottom. The bottom network layer is IP.

In addition to the TCP-like functions such as reliability and congestion control, QUIC further provides the following enhanced functions.

(a) Stream multiplexing (stream multiplexing) means that a plurality of byte streams can be simultaneously transmitted through a single connection (connection). Each byte stream is referred to as a stream (stream). The connection is used to establish a sharing status required for data transmission between two subjects. For example, the connection provides a security context (such as identity authentication, confidentiality protection, and security protection) required for data transmission, and the security context may also be referred to as connection information. The stream is used to provide a data transmission service in the security context provided by the connection.

The connection is uniquely identified by a connection identity (ID). Different connections have different connection IDs. In one connection, each stream is uniquely identified by a stream ID. A length of the stream identity is 64 bits, where the least significant 2 bits identify a type of the stream. For simplicity, it may be considered that the stream identity includes two parts such as a type of the stream (the least significant 2 bits) and an index of the stream (the remaining 62 bits). It indicates that each connection can create four different types of streams. A quantity of streams of each type that can be created is $2^{62}-1$, and each stream can independently provide a data transmission service for one application.

(b) A path is a transmission route between a client and a server, and is uniquely identified by a quintuple. The quintuple includes a source IP address, a destination IP address, a source port, a destination port, and a protocol. For QUIC, a protocol in the quintuple is specified as UDP.

(2) Telemetry is a technology of remotely collecting data from a physical or virtual device at a high speed. The device actively sends interface traffic statistics information, central processing unit (CPU) information, memory data information, or the like of the device to a collector in push mode periodically. Compared with a conventional pull mode with question-answer interaction, the push mode provides a faster and more real-time data collection function.

The telemetry includes a telemetry device side and a telemetry network management system side. The telemetry device side provides raw data, a data model, an encoding format, and a transport protocol. The telemetry network management system side provides a collection system, a storage protocol, and an application analysis system.

The raw data is collected data such as interface sending and receiving statistics, CPU/memory usage, and a protocol running status.

The data model is defined based on the collected data.

The transport protocol is a protocol such as TCP, UDP, or gRPC. Currently, a recommended transport protocol in the telemetry is gRPC.

The encoding format is an encoding format used for data transmission. The encoding format may be an Extensible Markup Language (XML), JavaScript Object Notation (JSON), a GOOGLE protocol buffer (GPB), or the like. GPB has a simplest structure and occupies a smallest quantity of bytes to transmit a same amount of information.

The collection system is a system used by the telemetry network management system side to collect the data.

The storage protocol is a protocol used by the telemetry network management system side to store the data.

The application analysis system is an analysis system used by the telemetry network management system side to analyze the data on the telemetry device side. The application analysis system includes one or more applications, and different applications are used to analyze different types of data.

Figure 2:
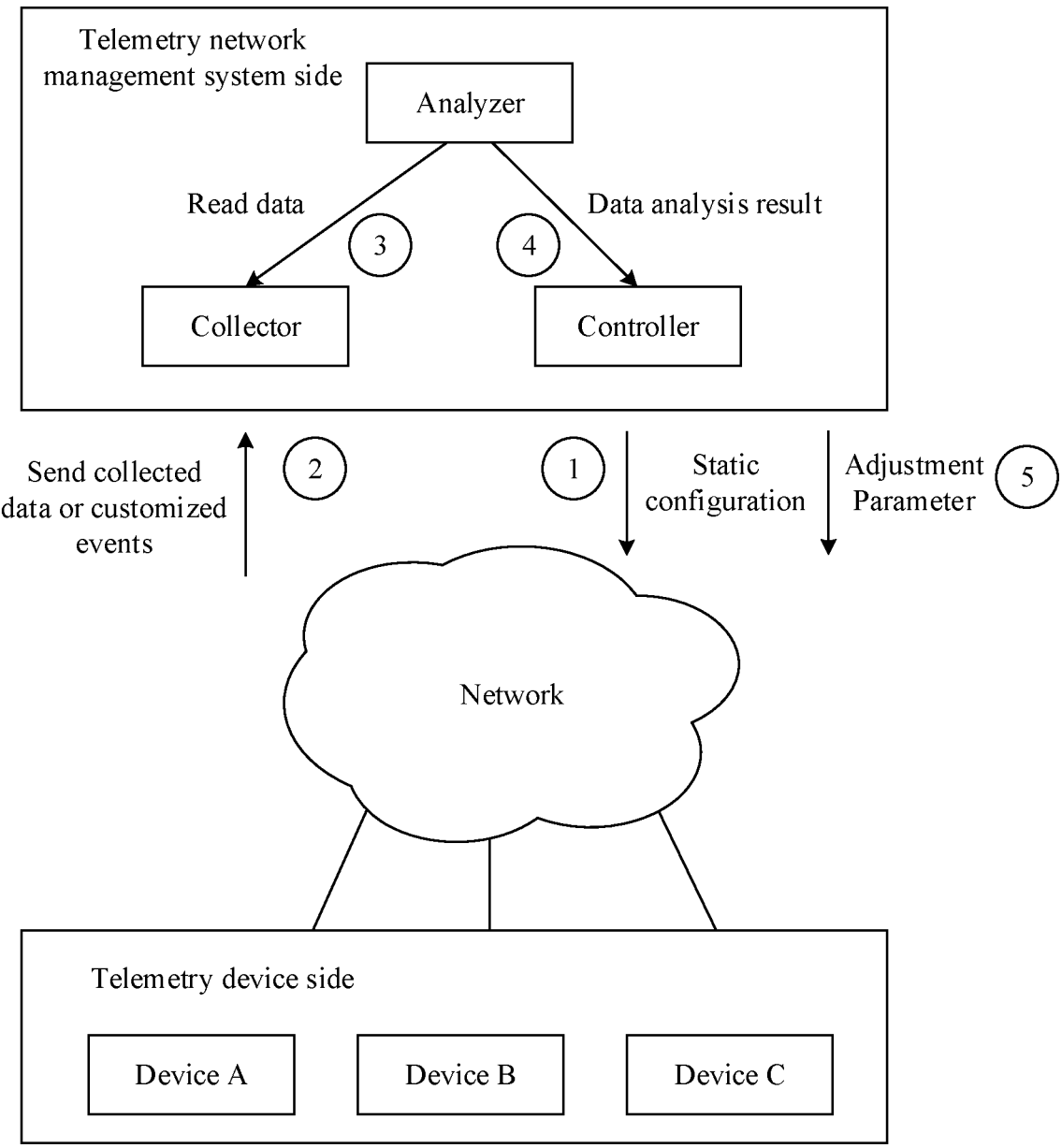
FIG. 2 is a schematic diagram of remote data collection according to an example embodiment of this application.

During implementation of the telemetry, the telemetry network management system side can subscribe to the data from the telemetry device side in a static or dynamic subscription manner. The telemetry device side sends device running status data to the telemetry network management system side in real time by using a protocol such as TCP, UDP, or gRPC. FIG. 2 shows the static subscription manner. In FIG. 2, the telemetry network management system side includes an analyzer, a collector, and a controller, and the telemetry device side includes a device A, a device B, and a device C. Example steps are as follows. The controller statically configures to-be-collected data. The telemetry device side sends the collected data to the collector, and the collector collects the data sent by the telemetry device side. The analyzer reads, from the collector, the data collected by the telemetry device side, and analyzes the data to obtain a data analysis result. The analyzer sends the data analysis result to the controller. The controller initiates a parameter adjustment indication to the telemetry device side.

Figure 3:
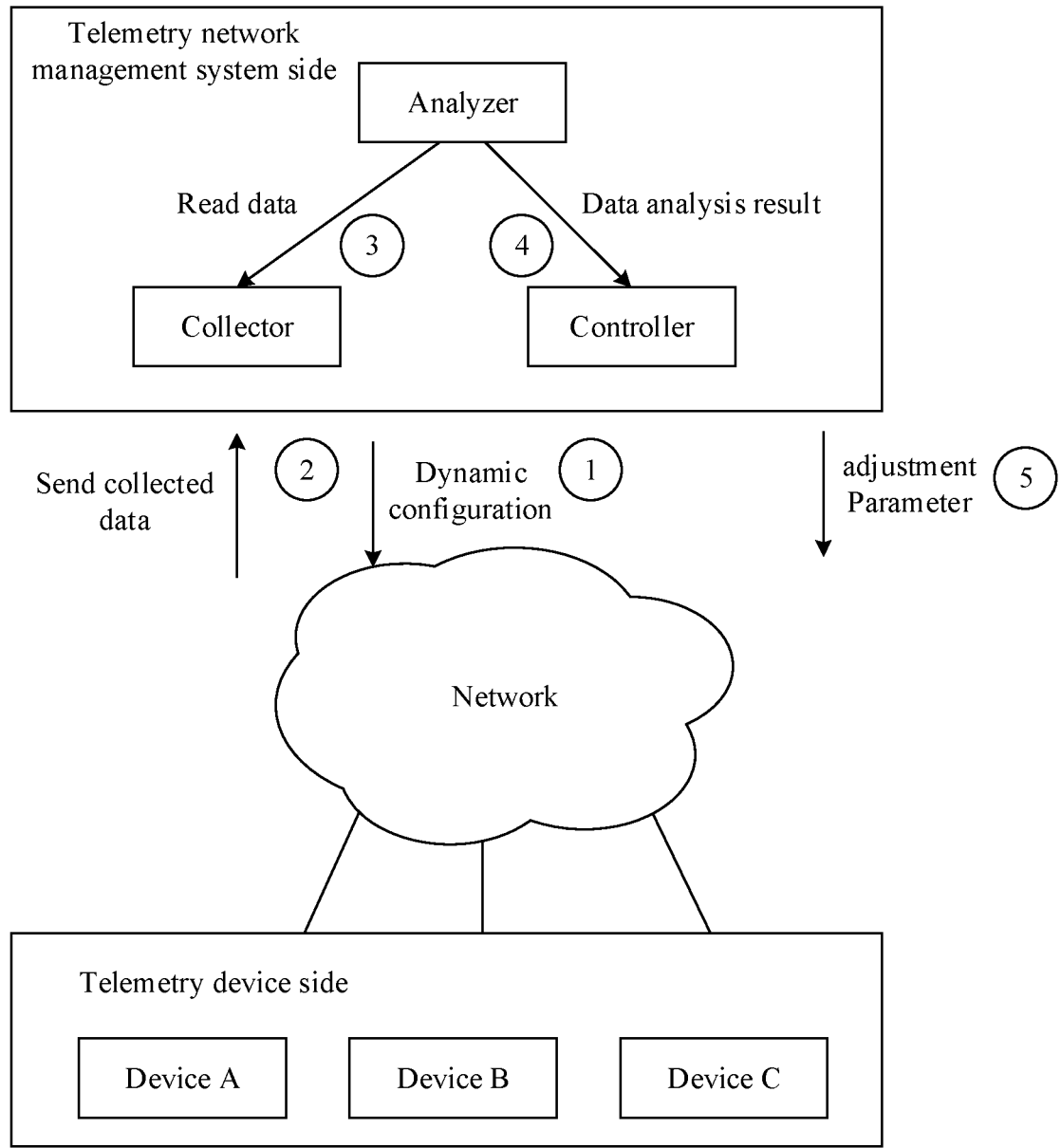
FIG. 3 is a schematic diagram of remote data collection according to an example embodiment of this application.

FIG. 3 shows the dynamic subscription manner. In FIG. 3, the telemetry network management system side includes an analyzer, a collector, and a controller, and the telemetry device side includes a device A, a device B, and a device C. Example steps are as follows. The controller dynamically configures to-be-collected data. The telemetry device side sends the collected data to the collector, and the collector collects the data sent by the telemetry device side. The analyzer reads, from the collector, the data collected by the telemetry device side, and analyzes the data to obtain a data analysis result. The analyzer sends the data analysis result to the controller. The controller initiates a parameter adjustment indication to the telemetry device side.

(3) A distributed system is a system that includes a plurality of apparatuses and is externally presented as one device. The plurality of apparatuses is run by using different devices. For example, the plurality of apparatuses is run on different routers, and the routers form a cluster router. Alternatively, the plurality of apparatuses is run by using a same device. For example, the plurality of apparatuses includes a main board and a line card, and the main board and the line card are run by using one network device. The following describes the distributed system from perspectives of a physical device form and a system form by using examples.

(a) The distributed system is of the physical device form.

Figure 4:
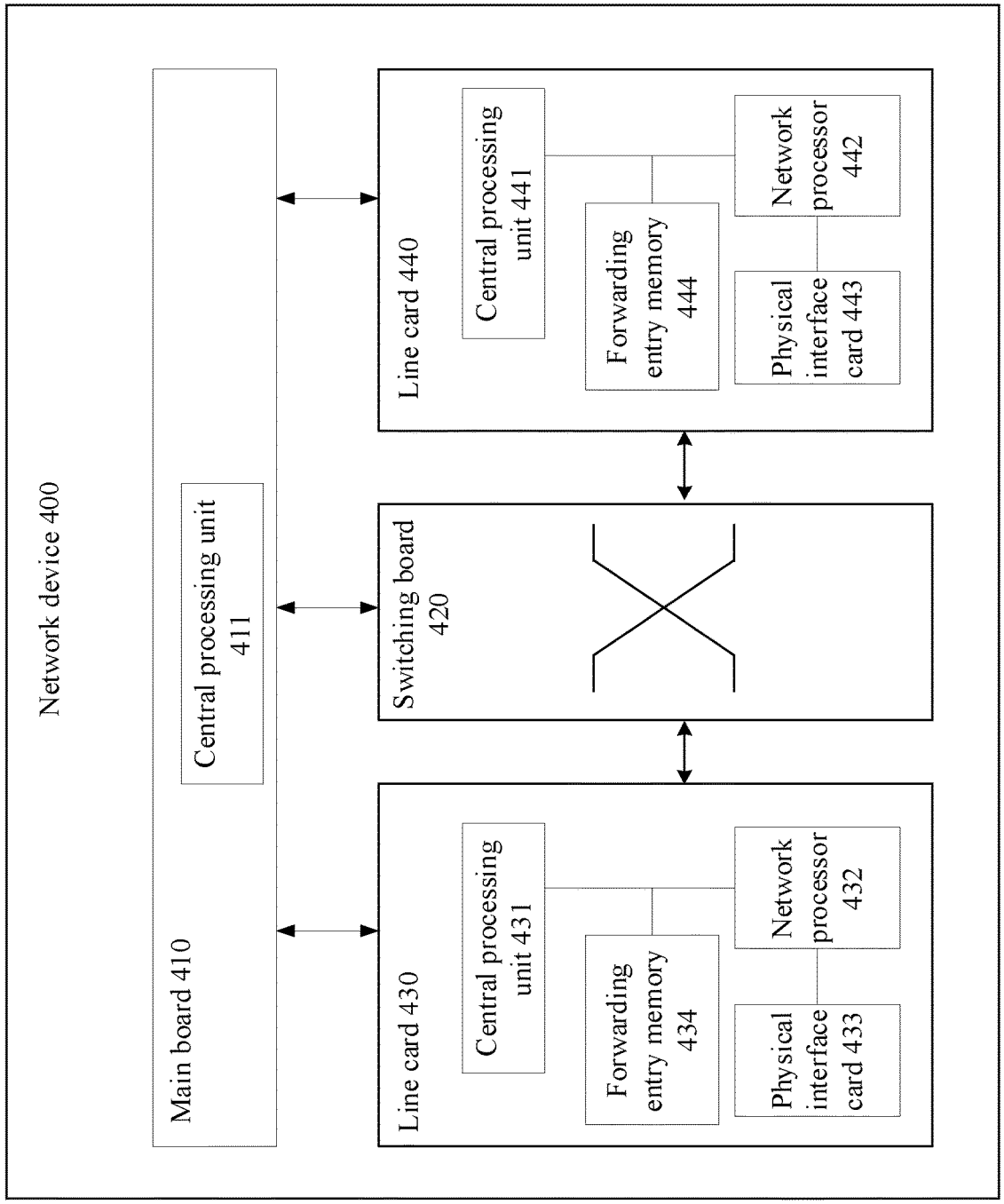
FIG. 4 is a schematic diagram of a structure of a network device according to an example embodiment of this application.

1. In an architecture 1, the network device is implemented by the distributed system. For example, the network device is a router or a switch. For a structure of the network device, refer to FIG. 4. In FIG. 4, the network device 400 includes a main board 410, a switching board 420, a line card 430, and a line card 440. The main board 410 includes a CPU 411. Optionally, the main board 410 may further include a memory that is not shown in FIG. 4. The line card 430 includes a CPU 431, a network processor 432, a forwarding entry memory 434, and a physical interface card (PIC) 433. The line card 440 includes a CPU 441, a network processor 442, a forwarding entry memory 444, and a physical interface card 443. FIG. 4 shows one main board. Actually, the network device 400 includes at least one main board. FIG. 4 shows two line cards. Actually, the network device 400 includes at least one line card.

The main board 410 is also referred to as a main processing unit (MPU) or a route processor card. The main board 410 is configured to run device-wide management and control protocols (for example, the Simple Network Management Protocol (SNMP), the File Transfer Protocol (FTP), the open shortest path first (OSPF), and the Border Gateway Protocol (BGP)), and generate a forwarding entry and then deliver the forwarding entry to the forwarding entry memories of all the line cards (the forwarding entry memory 434 of the line card 430 and the forwarding entry memory 444 of the line card 440), to guide packet forwarding on all the interfaces of the network device.

The line card 430 is also referred to as a line processing unit (LPU), a line card, or a service board. The line card 430 is configured to provide various service interfaces and forward a data packet. The service interface includes but is not limited to an Ethernet interface. The Ethernet interface is, for example, a Flexible Ethernet (FlexE) clients. The line card 430 is configured to run a current line card-related control protocol (for example, the Address Resolution Protocol (ARP), the Neighbor Discovery (ND), or the Link Layer Discovery Protocol (LLDP)), and generate a forwarding entry and then deliver the forwarding entry only to the forwarding entry memory 434 of the current line card 430, to guide packet forwarding only on the interface of the current line card 430.

The CPU 431 of the line card 430 is configured to control and manage the line card 430, and communicate with the CPU 411 of the main board 410.

The network processor 432 is configured to forward a packet. A form of the network processor 432 is, for example, a forwarding chip. In an example, the network processor 432 is configured to forward a received packet based on a forwarding table stored in the forwarding entry memory 434; and if a destination address of the packet is an address of the network device 400, send the packet to a CPU (for example, the CPU 411) for processing; or if the destination address of the packet is not the address of the network device 400, search, based on the destination address, the forwarding table for a next hop and an outbound interface that correspond to the destination address, and forward the packet to the outbound interface corresponding to the destination address. Processing of an upstream packet includes processing of an inbound interface of the packet, and forwarding table searching. Processing of a downstream packet includes forwarding table searching.

The physical interface card 433 is configured to implement an interconnection function at a physical layer. Original traffic enters the line card 430 from the physical interface card 433, and a processed packet is sent from the physical interface card 433. The physical interface card 433 is also referred to as a subcard, may be installed on the line card 430, and is responsible for converting an optical/electrical signal into a packet, performing validity check on the packet, and forwarding the packet to the network processor 432 for processing. In some embodiments, the CPU may also implement a function of the network processor 432, for example, implement software forwarding based on a general-purpose CPU, so that the network processor 432 is not required in the physical interface card 433.

For example, the line card 420 may also be referred to as a switch fabric unit (SFU). When the network device 400 has a plurality of line cards 430, the switching board 420 is configured to complete data exchange between line cards. For example, the line card 430 communicates with the line card 440 by using the switching board 420.

The main board 410 is coupled to the line card 430. For example, the main board 410, the line card 430, the line card 440, and the switching board 420 are connected to a system backplane through a system bus for interworking. In a possible implementation, an inter-process communication (IPC) channel is established between the main board 410 and the line card 430, and the main board 410 communicates with the line card 430 through the IPC channel.

Logically, the network device 400 includes a control plane and a forwarding plane. The control plane includes the main board 410, the CPU 431, and the CPU 441. The forwarding plane includes the components for performing forwarding, such as the forwarding entry memory 434, the physical interface card 433, and the network processor 432. The control plane performs functions such as route calculation, generating a forwarding table, processing signaling and a protocol packet, configuring and maintaining a status of the network device. The control plane delivers the generated forwarding table to the forwarding plane. On the forwarding plane, the network processor 432 performs table lookup and forwarding, based on the forwarding table delivered by the control plane, on a packet received by the physical interface card 433. The forwarding table delivered by the control plane may be stored in the forwarding entry memory 434 or the like. In some embodiments, for example, the control plane and the forwarding plane are completely separated and not on a same network device.

An operation on the line card 440 is consistent with an operation on the line card 430. For brevity, details are not described again.

Some protocols may be simultaneously run on the main board 410, the line card 430, and the line card 440. For example, the ARP (RFC 826) and the ND (RFC 4861) are simultaneously run on a main board and a line card. When being run on the main board 410, the protocol is used to complete IP/media access control (MAC) address resolution on a logical interface (for example, an Ethernet link aggregation (Eth-Trunk) interface). When being run on the line card 430 and the line card 440, the protocol is used to complete IP/MAC address resolution on a physical interface (for example, an Ethernet physical interface).

When the telemetry is used to collect real-time status information of the network device, the protocol also needs to be simultaneously run on the main board 410, the line card 430, and the line card 440. For example, CPU usage and an ARP/ND running status on the main board 410 need to be collected, and CPU usage and an ARP/ND running status on the line card 430 and those on the line card 440 also need to be collected.

In the architecture 1, the main board 410 is the following first apparatus, and the line card 430 and the line card 440 are the following second apparatuses.

2. In an architecture 2, the cluster router uses the distributed system. The cluster router is also referred to as a router matrix or multi-chassis interconnection. In an example, two or more common core routers are connected in a manner by using a parallel packet switch (PPS) technology, to jointly form a multi-level and multi-plane switching matrix system, so that the two or more common core routers can work cooperatively and are externally presented as only one logical router. In this way, the cluster router can break through limitations of a single chassis on switching capacity, power consumption, heat dissipation, and the like, and therefore can be expanded to a route switching system with larger capacity.

Figure 5:
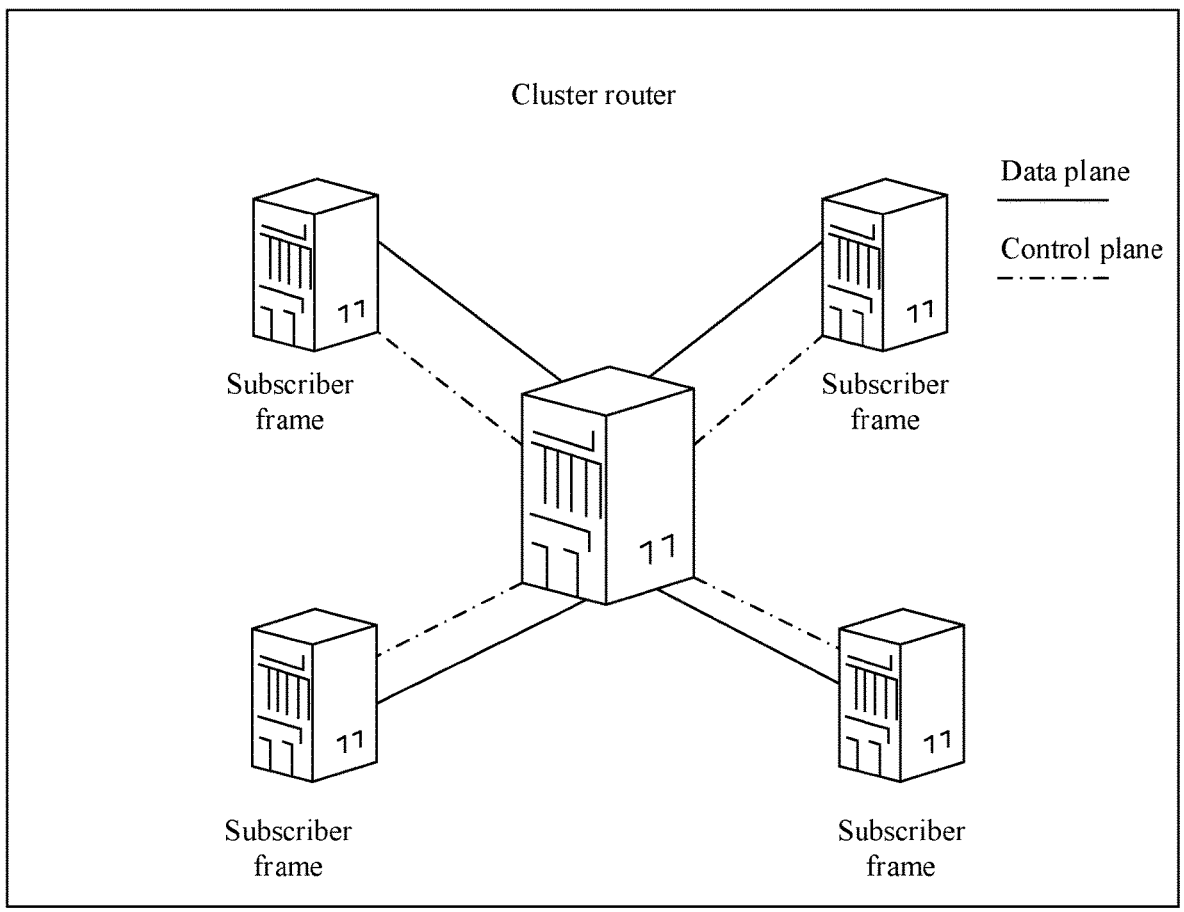
FIG. 5 is a schematic diagram of a structure of a cluster router according to an example embodiment of this application.

FIG. 5 is a schematic diagram of a cluster router. In FIG. 5, a subscriber frame (also referred to as a router) may run as an independent system. An independently running subscriber frame is a standalone system. A plurality of subscriber frames is cascaded through a switching frame to form a logical system, and are externally presented as a single router device. The subscriber frame, the switching frame, and cascading parts in the logical system are collectively referred to as a cluster system, that is, the cluster router. In a router cluster technology, routers in the cluster router can work cooperatively well through centralized and integrated control management. This greatly expands capacity of the router, and breaks through limitations of the standalone system on the development technology. In terms of costs, because the routers in the cluster routing system are interconnected by using high-speed optical fibers, a quantity of additional internal interconnection ports can be reduced. In addition, because the cluster router is externally presented as only one router, a network topology and a routing policy is simpler and clearer, and maintenance is faster and more convenient.

In the architecture 2, the subscriber frames included in the cluster router are a first apparatus and second apparatuses.

Figure 6:
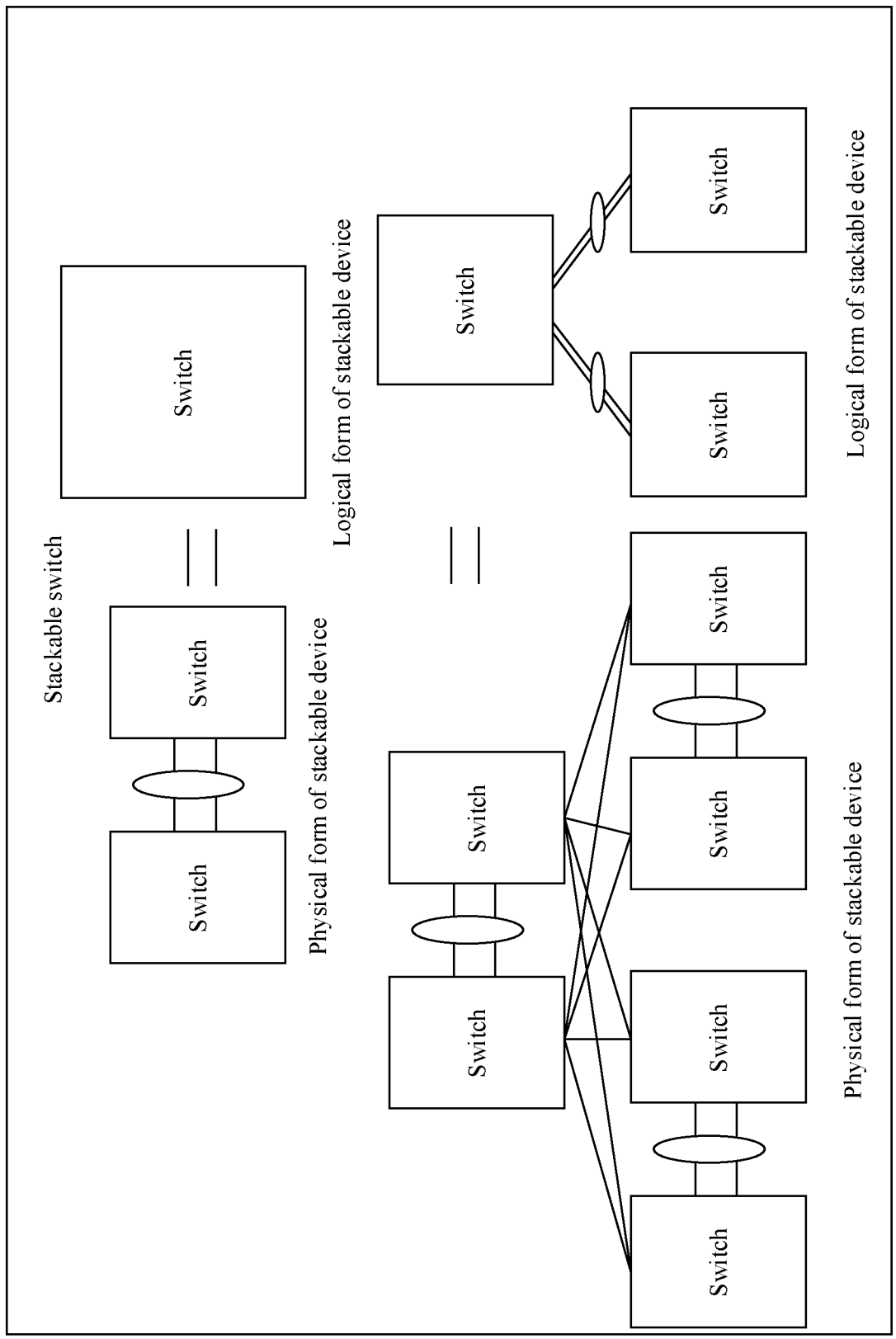
FIG. 6 is a schematic diagram of a structure of a stackable switch according to an example embodiment of this application.

3. In an architecture 3, as shown in FIG. 6, a stackable switch uses the distributed system. A plurality of physical switches is connected by using stack cables to construct a logical stackable switch system.

Stacking is characterized by the following.
a. Many-to-one virtualization of the switches: The stackable switch is externally presented as one logical switch, and control planes are integrated for unified management.
b. Integration of forwarding planes: During stacking, the forwarding planes of the physical devices are integrated to share and synchronize forwarding information in real time.
c. Inter-device link aggregation: During stacking, links of the physical devices are aggregated into one Ethernet aggregation (Eth-trunk) port for interconnection to a downstream device.

Stacking has the following advantages.
a. Simplified operation and maintenance: The entire stackable switch is managed as one switch, to simplify operation and maintenance and reduce operational expenditure (OPEX).
b. High reliability: If one device in the stackable switch is faulty, another device can take over control and forwarding of the stackable switch to prevent single point of failure.
c. Loop-free network: Inter-device link aggregation prevents a loop problem when the stackable switch and another device are interconnected. A complex loop avoidance protocol such as the Multiple Spanning Tree Protocol (MSTP) does not need to be deployed.
d. Link equalization: Inter-device link equalization achieves 100% network link and bandwidth utilization.

In the architecture 3, the plurality of switches included in the stackable switch are the following first apparatus and second apparatuses.

(b) The distributed system is of the system form.

Currently, CPUs all support a plurality of cores (multi-core) and a plurality of threads to provide stronger concurrent computing capabilities. To fully utilize the computing capabilities of the CPUs, large-scale, concurrent, and/or compute-intensive applications are usually implemented and deployed in the following manners.

1. Multi-Process Deployment

Figure 7:
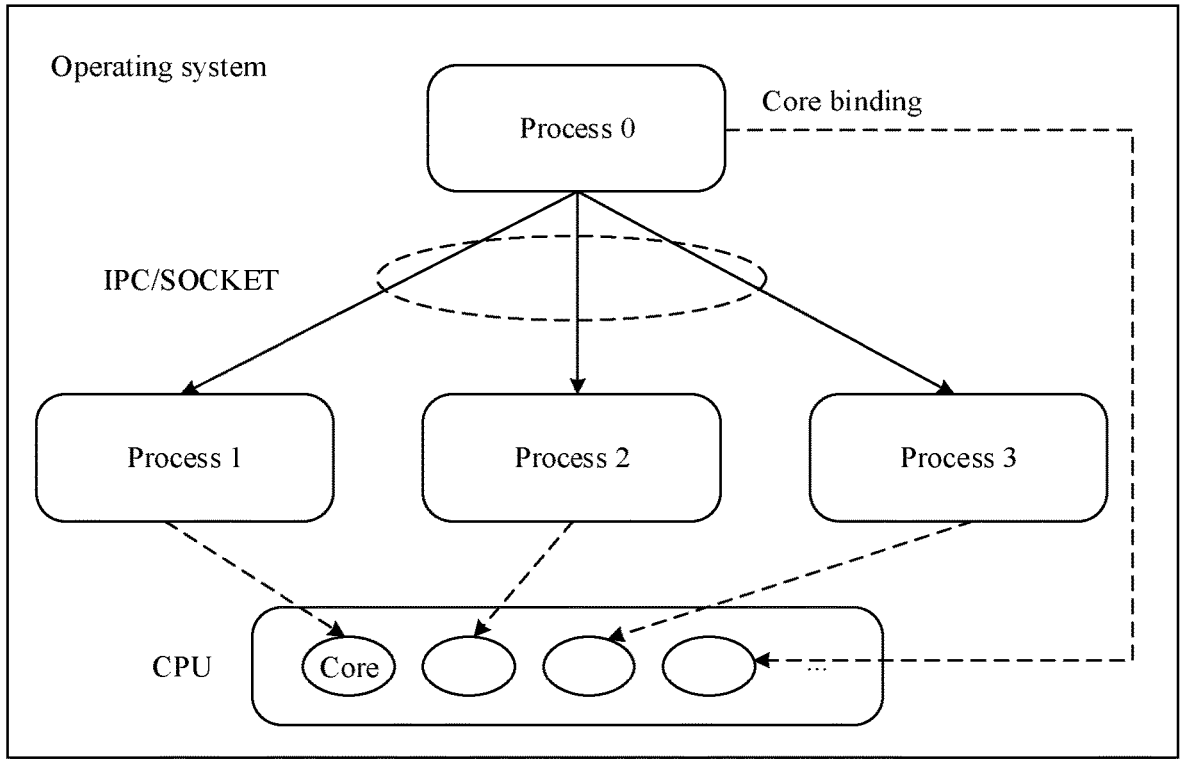
FIG. 7 is a schematic diagram of a structure of multi-process deployment according to an example embodiment of this application.

FIG. 7 is a schematic diagram of multi-process deployment. In FIG. 7, a process 0 to a process 3 jointly constitute a process group, and jointly complete a specified computing task. Processes communicate with each other through IPC or a socket defined in an operating system. The process 0 serves as a management process to be responsible for scheduling a management domain of the computing task. Certainly, the process 0 may alternatively serve as a working process to complete the related computing task. The process 1 to the process 3 are working processes, and receive the related computing task from the process 0 and execute the task. Different processes may exclusively occupy or share the CPU cores.

Certainly, a single-core CPU system also supports multi-process deployment. FIG. 7 shows only an example of multi-process deployment. A quantity of cores of a CPU and a multi-process deployment manner are not limited in this application.

During multi-process deployment, the process 0 is the following first apparatus, and the process 1 to the process 3 are the following second apparatuses.

2. Multi-Thread Deployment

Figure 8:
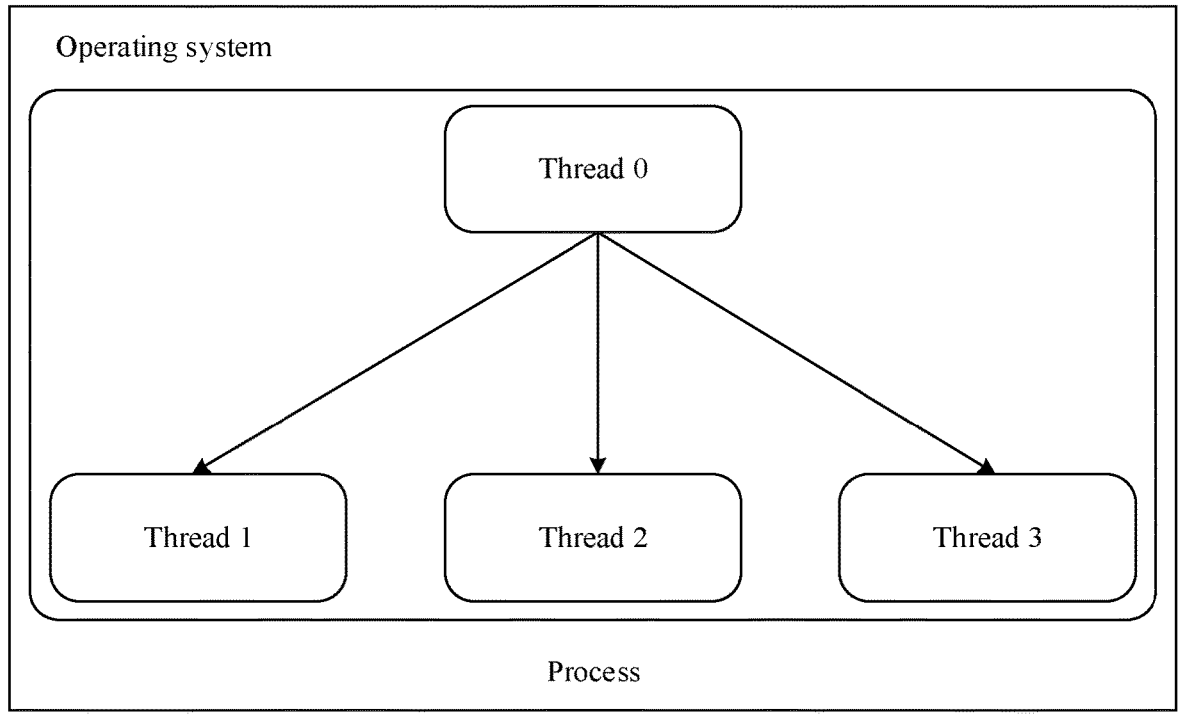
FIG. 8 is a schematic diagram of a structure of multi-process deployment according to an example embodiment of this application.

In a current operating system, process resource overheads are much greater than thread resource overheads. Therefore, most concurrent computing tasks are more commonly deployed in the multi-thread deployment manner. FIG. 8 is a schematic diagram of multi-thread deployment. In FIG. 8, in a single thread, an initial thread (thread 0) is responsible for managing and scheduling a computing task. In a running process, new working threads (a thread 1 to a thread 3) may be flexibly enabled as required. After a related computing subtask is completed, a specified thread (for example, the thread 3) may be disabled to reduce resource overheads. Certainly, the initial thread may also execute the related computing task.

In the multi-thread deployment manner, a single-core or multi-core CPU environment may be used. Different threads can be mapped to a same CPU core or different CPU cores.

During multi-thread deployment, the thread 0 is the following first apparatus, and the thread 1 to the thread 3 are the following second apparatuses.

It should be noted that only some forms of the distributed system are listed above. Certainly, there may be another form. For example, a plurality of microservices are implemented by using the distributed system. These forms are commonly characterized by the following.

The distributed system includes a plurality of apparatuses. There may be a master-slave relationship or a peer-to-peer relationship between the apparatuses, but the plurality of apparatuses are externally presented as a single logical device. The master-slave relationship is used to distinguish a master part from a slave part. The following first apparatus is a master part, and the following second apparatus is a slave part. If the plurality of apparatuses is in the peer-to-peer relationship, when the solution of this application is implemented, a logical master part may be selected based on an algorithm, and the algorithm may be any master selection algorithm. The second apparatus may also be referred to as a standby apparatus.

Optionally, the first apparatus may also be referred to as a management apparatus, and the second apparatus may also be referred to as a working apparatus.

The following describes a telemetry implementation solution in a related technology in which a network device serves as a telemetry device side to send data to a telemetry network management system side. For a structure of the telemetry network management system side in FIG. 9, refer to FIG. 3 and FIG. 4. The network device includes a main board and two line cards, and the main board and the two line cards constitute a distributed system. A transport protocol used by the main board is gRPC (FIG. 10 shows a gRPC protocol stack, including TCP, TLS, HTTP/2, gRPC, and a data model from bottom to top). A transport protocol used by the line card is UDP. A working process of interaction between the network device and the telemetry network management system side is as follows.

a. The telemetry network management system side configures data to be collected by the network device. For example, the data is sent by using a command-line interface (CLI) or the Network Configuration Protocol (NetConf).
 b. The main board of the network device delivers information about the to-be-collected data to the line card.
 c. The main board and the line card of the network device collect the data.
 d. The main board sends the collected data to the telemetry network management system side by using gRPC.
 e. The line card sends the collected data to the telemetry network management system side by using UDP.
 f. The telemetry management system side receives the data collected by the main board and the line card.

In the working process, the network device processes and filters the collected data before sending the data to the telemetry management system side.

Figure 9:
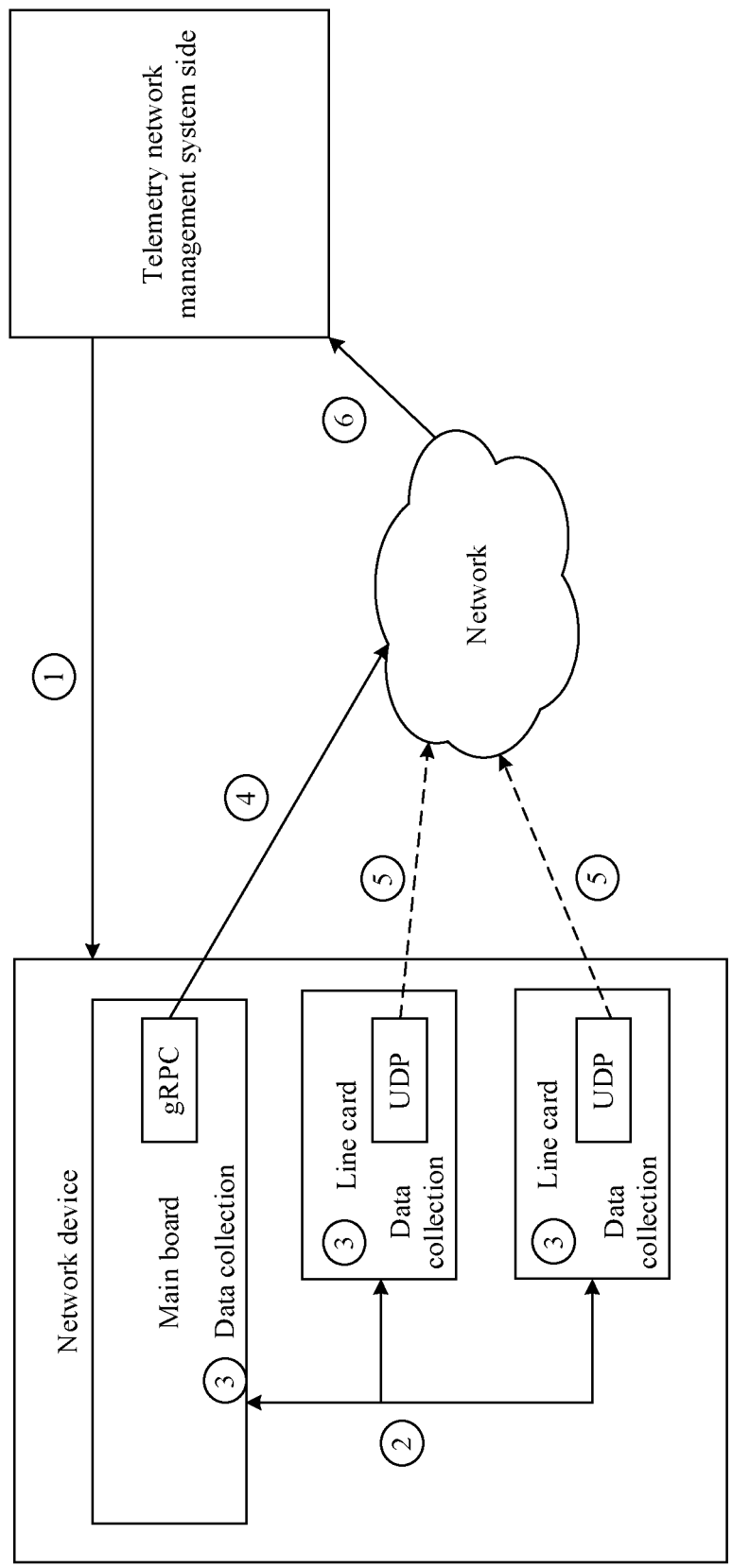
FIG. 9 is a schematic flowchart of remote data collection according to an example embodiment of this application.
Figure 10:
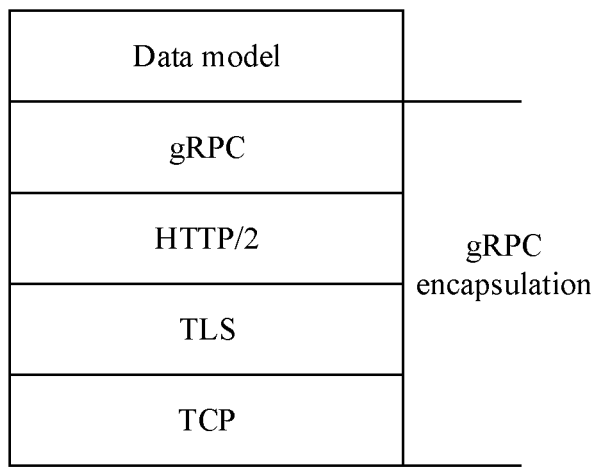
FIG. 10 is a schematic diagram of a gRPC protocol stack according to an example embodiment of this application.

In FIG. 9, a manner in which the main board and the line card send the collected data to the telemetry management system side at the same time is referred to as a distributed data collection manner. In this way, because both the main board and the line card can collect and send the data, working pressure of the main board can be relieved, and real-time performance of data collection can be ensured as much as possible.

Figure 11:
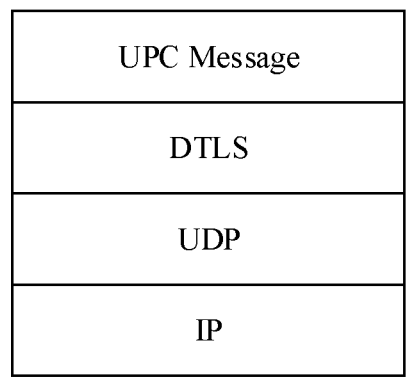
FIG. 11 is a schematic diagram of a UPC protocol stack according to an example embodiment of this application.

In FIG. 9, the reason why the line card sends the data to the telemetry management system side by using UDP instead of gRPC is that draft-ietf-netconf-udp-pub-channel-05 defines a manner of transmitting collected data by using UDP, and the manner is referred to as a UDP based publication channel (UPC). FIG. 11 shows a UPC protocol stack, including IP, UDP, the Datagram Transport Layer Security (DTLS), and the UPC message from bottom to top. The draft mainly considers the following content such as if gRPC is used on the line card, a large quantity of TCP connections is established, consuming IP addresses and port numbers. If the collected data is transmitted by using UDP, a connection does not need to be maintained on the line card. If lightweight UDP is used for encapsulation, better transmission performance is achieved.

In conclusion, in the telemetry implementation solution shown in FIG. 9, the main board and the line card use different transport protocols, causing relatively high implementation and maintenance complexity.

However, in the solutions of this application, one connection is established in the distributed system, and can be used by the first apparatus and the second apparatus in the distributed system to transmit data. Because one connection corresponds to one transport protocol, the distributed system transmits data by using only one transport protocol. This reduces implementation and maintenance complexity.

The following describes an example of an application scenario of an embodiment of this application.

Figure 12:
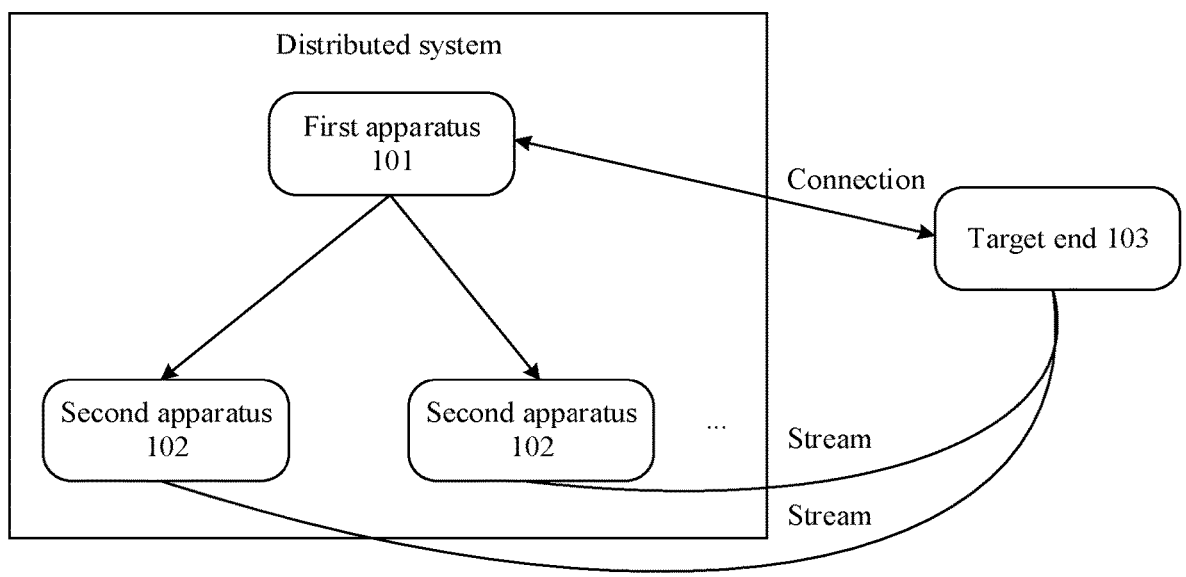
FIG. 12 is a schematic diagram of an application scenario of data transmission according to an example embodiment of this application.

FIG. 12 is a schematic diagram of a data transmission scenario according to an embodiment of this application. The schematic diagram of the scenario includes a first apparatus 101, M second apparatuses 102, and a target end 103.

The first apparatus 101 and the M second apparatuses 102 constitute a distributed system. The target end 103 is a distributed system or a standalone device. In this way, it is equivalent to that there are two cases. One case is that the distributed system to which the first apparatus 101 belongs communicates with the distributed system, and the other case is that the distributed system to which the first apparatus 102 belongs communicates with the standalone device. The first apparatus 101 and the second apparatus 102 separately transmit data to the target end 103.

Herein, the first apparatus 101 establishes a connection to the target end 103, and the connection is a target transport protocol-based connection. For example, a target transport protocol is a QUIC protocol. The second apparatus 102 does not establish a connection to the target end 103, but transmit data to the target end 103 by using a stream of the connection.

In the data transmission scenario in FIG. 12, the first apparatus 101 establishes the connection to the target end 103 in two manners. In a first manner, the first apparatus 101 initiates a connection request to the target end 103, where the connection request is used to request to establish a connection, and the target end 103 passively establishes the connection to the first apparatus 101. In a second manner, the target end 103 initiates a connection request to the first apparatus 101, where the connection request is used to request to establish a connection, and the first apparatus 101 passively establishes the connection to the target end 103. For example, in a process in which the first apparatus 101 establishes the connection to the target end 103, identity authentication and encryption/decryption key negotiation are completed. Identity authentication and encryption/decryption key are used to ensure confidentiality and integrity of a packet during data transmission.

After the first apparatus 101 establishes the connection to the target end 103, the first apparatus 101 sends connection information of the connection to the second apparatus 102. The connection information is used to indicate a parameter required for transmitting data to the target end 103. For example, the connection information includes an encryption/decryption key. The second apparatus 102 can transmit the data to the target end 103 by using the stream of the connection.

The following describes examples of method procedures in embodiments of this application.

Figure 13:
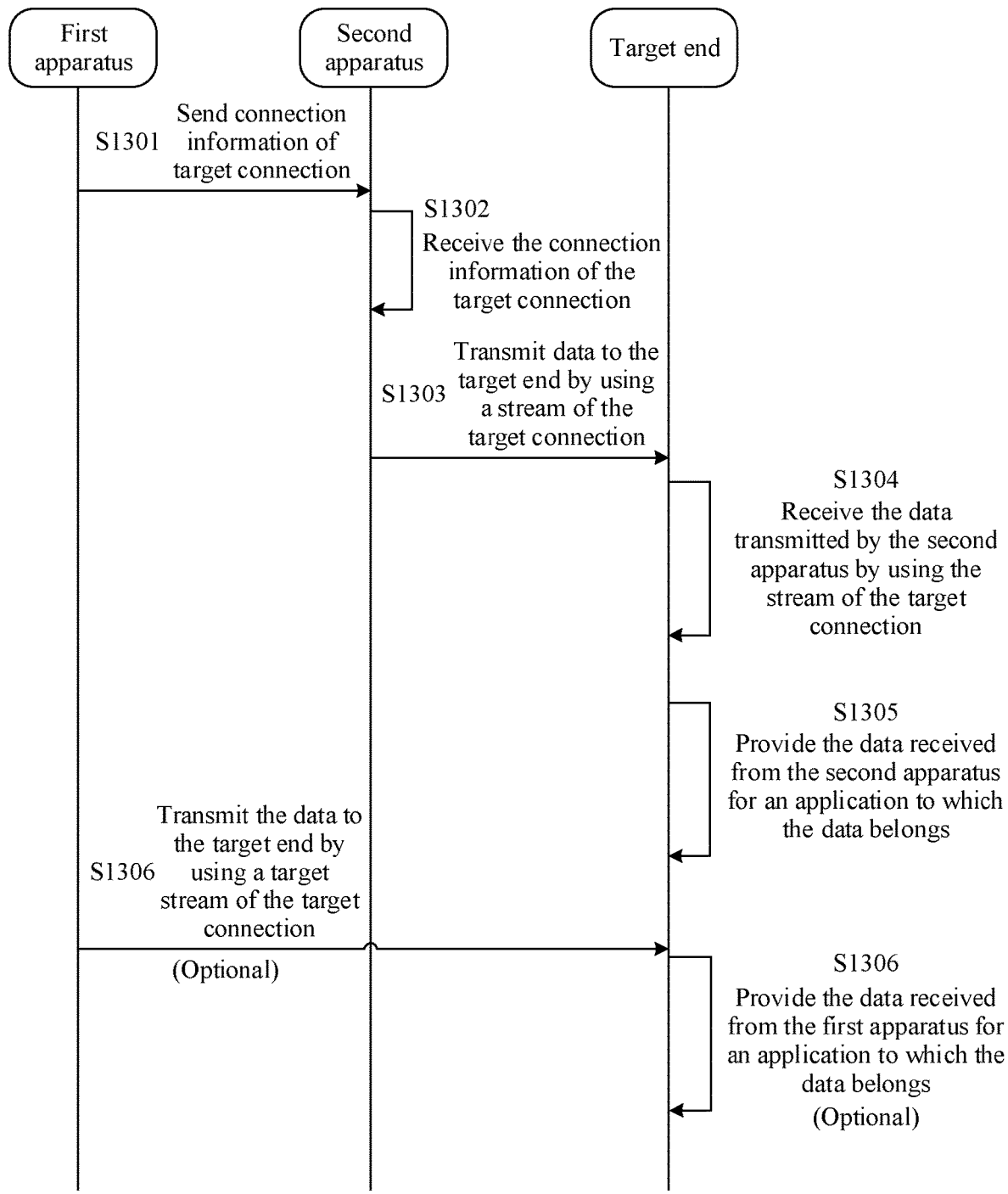
FIG. 13 is a schematic flowchart of a data transmission method according to an example embodiment of this application.

FIG. 13 is a flowchart of a data transmission method according to an embodiment of this application. The method shown in FIG. 13 includes step S1301 to step S1306.

The method shown in FIG. 13 relates to a process in which a first apparatus sends connection information of a target connection to a second apparatus and the second apparatus transmits data to a target end based on the connection information.

A scenario on which the method shown in FIG. 13 is based is optionally shown in FIG. 12. For example, with reference to FIG. 12, the first apparatus in the method shown in FIG. 13 is the first apparatus 101 in FIG. 12. The second apparatus in the method shown in FIG. 13 is the second apparatus 102 in FIG. 12. The target end in the method shown in FIG. 13 is the target end 103 in FIG. 12. The target connection in the method shown in FIG. 13 is the connection established between the first apparatus 101 and the target end 103. FIG. 13 shows only one second apparatus.

Step S1301: The first apparatus sends connection information of a target connection to each of N second apparatuses in M second apparatuses.

In this embodiment, a distributed system includes the first apparatus and the M second apparatuses. The first apparatus establishes the target connection to the target end, the target connection is a target transport protocol-based connection, and the target connection is uniquely determined by a target connection identity. Each of the N second apparatuses in the M second apparatuses transmits data to the target end.

The first apparatus is configured with information about each of the N second apparatuses. For example, the information about each of the N second apparatuses is an IP address. The first apparatus sends the connection information of the target connection to each of the N second apparatuses by using the information about each of the N second apparatuses. The connection information is used to indicate a parameter required for data transmission, such as an encryption/decryption key and the target connection identity. Subsequently, the second apparatus transmits the data to the target end by using the parameter required for data transmission. When the first apparatus and the second apparatus are located in one device, the first apparatus may alternatively communicate with the second apparatus through a bus or the like.

For example, a target transport protocol is a QUIC protocol. In this embodiment of this application, that the target transport protocol is the QUIC protocol is used as an example for description.

Step S1302: The second apparatus receives the connection information of the target connection that is sent by the first apparatus.

In this embodiment, each of the N second apparatuses receives the target connection information.

Optionally, the first apparatus can specify the data transmitted by the second apparatus, and the processing is as follows.

The first apparatus is configured with the data to be transmitted by each of the N second apparatuses. By using the data to be transmitted by each of the N second apparatuses, the first apparatus determines an application identity corresponding to the to-be-transmitted data, and the application identity is an identity of an application through which the target end receives the data. Before each of the N second apparatuses transmits the data to the target end, the first apparatus sends the application identity to each of the N second apparatuses. After receiving the application identity, the second apparatus obtains a correspondence between the preconfigured application identity and the to-be-transmitted data. The second apparatus determines, from the correspondence, the to-be-transmitted data corresponding to the received application identity. In this way, the second apparatus knows the to-be-transmitted data, and then transmits the data. The data to be transmitted by the second apparatus may be collected in real time or in advance.

Optionally, in the QUIC protocol, the application identity is an Application Layer Protocol Negotiation (ALPN) name.

Certainly, the first apparatus may not send the application identity to each of the N second apparatuses, and each of the N second apparatuses is triggered to transmit the data to the target end provided that each of the N second apparatuses receives the connection information of the target connection that is sent by the first apparatus.

Step S1303: Each of the N second apparatuses transmits the data to the target end based on the connection information by using at least one stream of the target connection.

In this embodiment, the second apparatus in step S1302 and step S1303 belongs to the N second apparatuses. After each of the N second apparatuses receives the connection information sent by the first apparatus, when being to transmit the data to the target end, each of the N second apparatuses transmits the data to the target end by using the stream of the target connection. For example, after collecting CPU utilization data, the second apparatus transmits the CPU utilization data to the target end by using the stream of the target connection.

Optionally, when two second apparatuses transmit the data by using a same stream, the data can also be successfully sent. However, because the two second apparatuses use the same stream, stream control and congestion control are inconvenient. This is because compared with a case in which one stream corresponds to one apparatus, a case in which one stream corresponds to two apparatuses is more inconvenient for control.

Optionally, when different second apparatuses transmit data to the target end by using different streams, to distinguish between the different streams, each stream is uniquely determined by a target connection identity and a stream identity. The different streams have a same target connection identity, and the identity is used to indicate that the streams all belong to the target connection. The different streams have different stream identities, and the identities are used to indicate the different streams. When the second apparatus transmits the data to the target end by using the stream of the target connection, the data carries the connection identity and the stream identity of the target connection. In this way, after receiving the data, the target end knows that the data is the data of the target connection, and can distinguish between the different streams of the target connection.

Optionally, when the target transport protocol is the QUIC protocol, the stream is a stream. After receiving the connection information, each of the N second apparatuses establishes a stream instance. For example, establishing the stream instance is applying for a data cache, or determining a stream identity. After establishing the stream instance, the second apparatus transmits the data to the target end by using the established stream instance.

Optionally, to make the streams used by the N second apparatuses different, there are a plurality of processing manners, and the following provides two processing manners.

Manner 1: The first apparatus separately sends different identity ranges of the streams to the N second apparatuses, and the N second apparatuses receive the different identity ranges. The second apparatus receives the identity range of the stream that is sent by the first apparatus. The second apparatus generates, by using the received identity range, a stream identity belonging to the identity range. In this way, because the N second apparatuses receive the different identity ranges, the stream identities generated by the N second apparatuses are different, to distinguish between the different streams.

Manner 2: The first apparatus generates different stream identities for the N second apparatuses, and separately sends the stream identities to the N second apparatuses.

Step S1304: The target end receives the data transmitted by each of the N second apparatuses by using the at least one stream of the target connection.

In this embodiment, the target end receives the data transmitted by each of the N second apparatuses by using the stream of the target connection, and the N second apparatuses use a same stream or different streams.

Step S1305: The target end provides the data for an application to which the data belongs.

In this embodiment, after receiving the data, the target end provides the received data for the application to which the data belongs, and the application to which the data belongs stores or analyzes the received data.

In the process shown in FIG. 13, the first apparatus and each of the N second apparatuses transmit data to the target end by using a same path.

In an example, in the target connection, the first apparatus and each of the N second apparatuses transmit the data to the target end by using the same path. The same path herein is a same quintuple. For example, both the first apparatus and the second apparatus communicate with the target end, the target end serves as a data receiving end, and the first apparatus and the second apparatus use a same destination IP address and a same destination port. The first apparatus and the second apparatus serve as data sending ends, and the first apparatus and the second apparatus use a same source IP address and a same source port. The first apparatus and the second apparatus also use a same protocol for data transmission. Using the same path herein is also referred to as using a single path. In this way, because the first apparatus and each of the N second apparatuses use the same path in the target connection, IP address and port number resources can be saved.

For example, after the first apparatus and each of the N second apparatuses transmit the data to the target end, the target end feeds back a response packet to the first apparatus and each of the N second apparatuses based on a data receiving status. The response packet carries a stream identity, and the stream identity is a stream identity that is of a stream used by the data and that is indicated by the response packet. Because the first apparatus and each of the N second apparatuses transmit the data to the target end by using the same path, all the response packets arrive at the first apparatus. Assuming that a response packet is a packet returned based on a target data receiving status, the first apparatus obtains a stream identity in the response packet, and determines a second apparatus corresponding to the stream identity. The first apparatus sends the response packet to the second apparatus, and the second apparatus is an apparatus that sends target data to the target end. In this way, in the single-path scenario, because all the response packets need to be forwarded by the first apparatus, processing pressure of the first apparatus is relatively high. In addition, when the response packet is an acknowledgment (ACK) packet, a delay of the response packet is increased. This is unfavorable to congestion control processing.

In the process shown in FIG. 13, at least two apparatuses in the first apparatus and the N second apparatuses transmit data to the target end by using different paths.

In an example, the at least two apparatuses in the distributed system transmit the data to the target end by using the different paths in the target connection, and the at least two apparatuses belong to the first apparatus and the N second apparatuses. Using the different paths herein is also referred to as using a plurality of paths (multi-path). For example, the first apparatus and each of the N second apparatuses use different quintuples. In this case, more IP address and/or port number resources are consumed in the target connection, but distributed processing can be implemented. Instead, on the single path, the first apparatus needs to forward the response packet. Therefore, better transmission performance can be achieved.

Optionally, before step S1301, the first apparatus establishes the target connection to the target end. The following provides two connection establishment manners.

Manner 1: The first apparatus initiates establishment of the target connection to the target end.

In this embodiment, the first apparatus receives an instruction entered by a user. The instruction includes an IP address and a UDP port of the target end, and the IP address and the UDP port of the target end are used to establish the target connection to the first apparatus. The first apparatus sends a connection request to the target end. A destination address of the connection request is the IP address of the target end, and a port of the connection request is the UDP port of the target end. The target end receives the connection request sent by the first apparatus. The target end verifies an identity of the first apparatus. If the verification succeeds, the target end negotiates with the first apparatus about an encryption/decryption key. If the verification fails, the target end does not establish the target connection to the first apparatus. After the first apparatus and the target end complete the identity verification and the encryption/decryption key negotiation, the first apparatus establishes the target connection to the target end.

Optionally, the first apparatus and the second apparatus are clients, and the target end is a server. The target end includes three apparatuses, and the three apparatuses are a first apparatus, a second apparatus, and a third apparatus. The first apparatus is an interface configured to listen to the connection request. After the identity verification on the first apparatus succeeds, the first apparatus provides the connection request that is listened to for the second apparatus. The second apparatus is configured to establish the target connection to the first apparatus, and provide the connection information of the target connection to the third apparatus. The third apparatus transmits data to the client based on the stream of the target connection. The first apparatus and the second apparatus are integrated together, the third apparatus is independently deployed, and the target end is equivalent to a distributed system. Alternatively, the first apparatus, the second apparatus, and the third apparatus are separately deployed, and the target end is equivalent to a distributed system. Alternatively, the first apparatus, the second apparatus, and the third apparatus are integrated together, and the target end is a standalone device as a whole instead of a distributed system.

Manner 2: The target end initiates establishment of the target connection to the first apparatus.

In this embodiment, the target end receives an instruction entered by a user. The instruction includes an IP address and a UDP port of the first apparatus, and the IP address and the UDP port of the first apparatus are used to establish the target connection to the target end. The target end sends a connection request to the first apparatus. A destination address of the connection request is the IP address of the first apparatus, and a port of the connection request is the UDP port of the first apparatus. The first apparatus receives the connection request sent by the target end. The first apparatus verifies an identity of the target end. If the verification succeeds, the first apparatus negotiates with the target end about an encryption/decryption key. If the verification fails, the first apparatus does not establish the target connection to the target end. After the target end and the first apparatus complete the identity verification and the encryption/decryption key negotiation, the first apparatus establishes the target connection to the target end.

The foregoing manner 1 and manner 2 are merely optional connection establishment manners, and any manner used to establish the target connection between the first apparatus and the target end can be used in embodiments of this application.

Optionally, when the N second apparatuses use different streams of the target connection, to enable the target end to distinguish between the different streams and send different pieces of data of the different streams to applications to which the different pieces of data belong, processing is as follows.

When the first apparatus initiates establishment of the target connection to the target end, the first apparatus obtains an application identity list of the first apparatus. Application identities included in the application identity list are application identities of applications to which the data transmitted by the first apparatus to the target end and the data transmitted by the second apparatus to the target end belong. For example, if the application identity is a CPU identity, transmitted data is CPU-related data, and an application to which the data belongs to the target end. The first apparatus adds the application identity list of the first apparatus to the connection request, and sends the connection request to the target end. The target end determines an application that matches the application identity in the connection request, and returns an application identity of the matched application to the first apparatus. The first apparatus receives the application identity returned by the target end, and determines that the distributed system to which the first apparatus belongs can transmit the data corresponding to the application identity to the target end. The first apparatus negotiates with the target end about the application identity corresponding to the data that can be transmitted by the first apparatus. Certainly, the application identity may alternatively be preconfigured.

Optionally, after the first apparatus establishes the target connection to the target end, the target end establishes a binding relationship between the application identity returned to the first apparatus and the IP address and the UDP port of the target end. The binding relationship indicates that the application bound to the IP address and the UDP port can receive the data from the IP address and the UDP port. In this way, in step S1305, the target end may provide, for the application to which the data belongs based on the IP address and the UDP port, the data sent by each of the N second apparatuses.

For example, before establishing the binding relationship between the application identity and the IP address and the UDP port of the target end, the target end establishes a QUIC server instance of the IP address and the UDP port, in an example, establishes a cache that can be used by the IP address and the UDP port. Then, the target end controls the application to register with the application identity from the QUIC server instance, to establish the binding relationship between the application identity and the IP address and the UDP port of the target end.

Optionally, when different applications are distinguished between each other by using application identities, to enable an application of the target end to accurately receive data that belongs to the application, there are a plurality of processing manners. The following provides two types of processing manners.

(1) The first apparatus sends an application identity corresponding to the at least one stream to the target end. In this way, the target end can identify the application identity corresponding to the at least one stream, and transmit, to the application to which the data belongs, the data sent by using the at least one stream.

For example, the first apparatus sends a correspondence between the identity range of the at least one stream and the application identity to the target end. After receiving the correspondence between the identity range of the at least one stream and the application identity, the target end stores the correspondence. In this way, after receiving the data transmitted by using the at least one stream, the target end may determine, by using the stream identity of the at least one stream, the identity range to which the stream identity of the at least one stream belongs. The target end determines, from the stored correspondence, the application identity corresponding to the identity range. In this way, the target end provides the data for the application to which the application identity belongs.

For example, the first apparatus sends a correspondence between the stream identity of the at least one stream and the application identity to the target end. In this case, the first apparatus generates a stream identity for each of the N second apparatuses, or each of the N second apparatuses sends a generated stream identity to the first apparatus.

(2) The at least one stream carries the application identity corresponding to the transmitted data. In this way, after receiving the data transmitted by using the at least one stream, the target end can provide, based on the carried application identity, the data for the application to which the data belongs.

For example, a specified location of each stream carries the application identity. For example, the specified location is the first frame.

For example, when the stream identity of the at least one stream is generated, the stream identity of each stream includes a field indicating the application identity. For example, the first P bytes of the stream identity of each stream is the field indicating the application identity. For another example, the first P bytes of the stream identity of each stream is the application identity.

This is only a possible implementation in which the target end obtains the application identity corresponding to the at least one stream. Certainly, there may be another implementation. This is not limited in this embodiment of this application.

It should be noted that, when the distributed system transmits data to different applications of the target end, the data transmitted to the different applications of the target end is transmitted by using different streams. This can prevent the target end from distributing the data to an incorrect application.

Optionally, the first apparatus may alternatively transmit the data to the target end by using a target stream of the target connection. In an example, in step S1306, the first apparatus transmits the data to the target end by using the target stream. For details, refer to FIG. 13. Step S1306 may be performed before step S1301, or may be performed between step S1301 and step S1305, or may be performed after step S1305. This is not limited in this embodiment of this application.

It should be noted that the target stream is a stream of the target connection, and a difference between the target stream and the stream used by the second apparatus lies in a stream identity.

Figure 14:
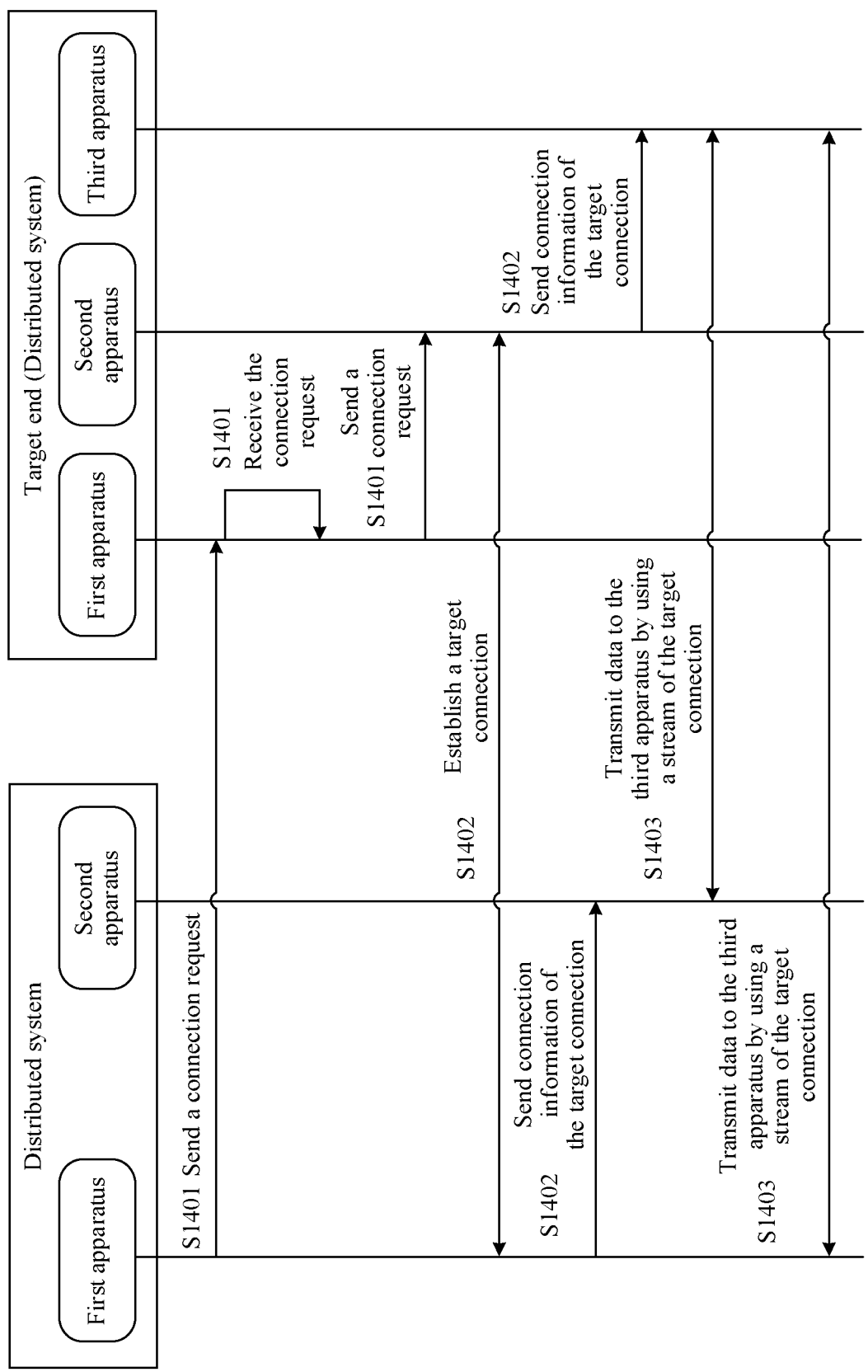
FIG. 14 is a schematic flowchart of a data transmission method according to an example embodiment of this application.

In the process shown in FIG. 13, only a case in which the target end performs data transmission with the first apparatus and the second apparatus as a whole is shown. FIG. 14 shows a data transmission status of a target end serving as a distributed system. In FIG. 14, the target end is also the distributed system. An example processing process is as follows.

Step S1401: A first apparatus sends a connection request to a first apparatus of the target end, the first apparatus of the target end receives the connection request sent by the first apparatus, and the apparatus provides the connection request to a second apparatus.

S1402: The second apparatus establishes a target connection to the first apparatus, the second apparatus sends connection information of the target connection to a third apparatus, and the first apparatus sends the connection information of the target connection to the second apparatus.

S1403: Each third apparatus receives the connection information, and each third apparatus receives data sent by the first apparatus and the second apparatus by using a stream of the target connection, or sends data to the first apparatus and the second apparatus by using a stream of the target connection. It should be noted that there may be one or more third apparatuses, and FIG. 14 shows only one third apparatus.

Figure 15:
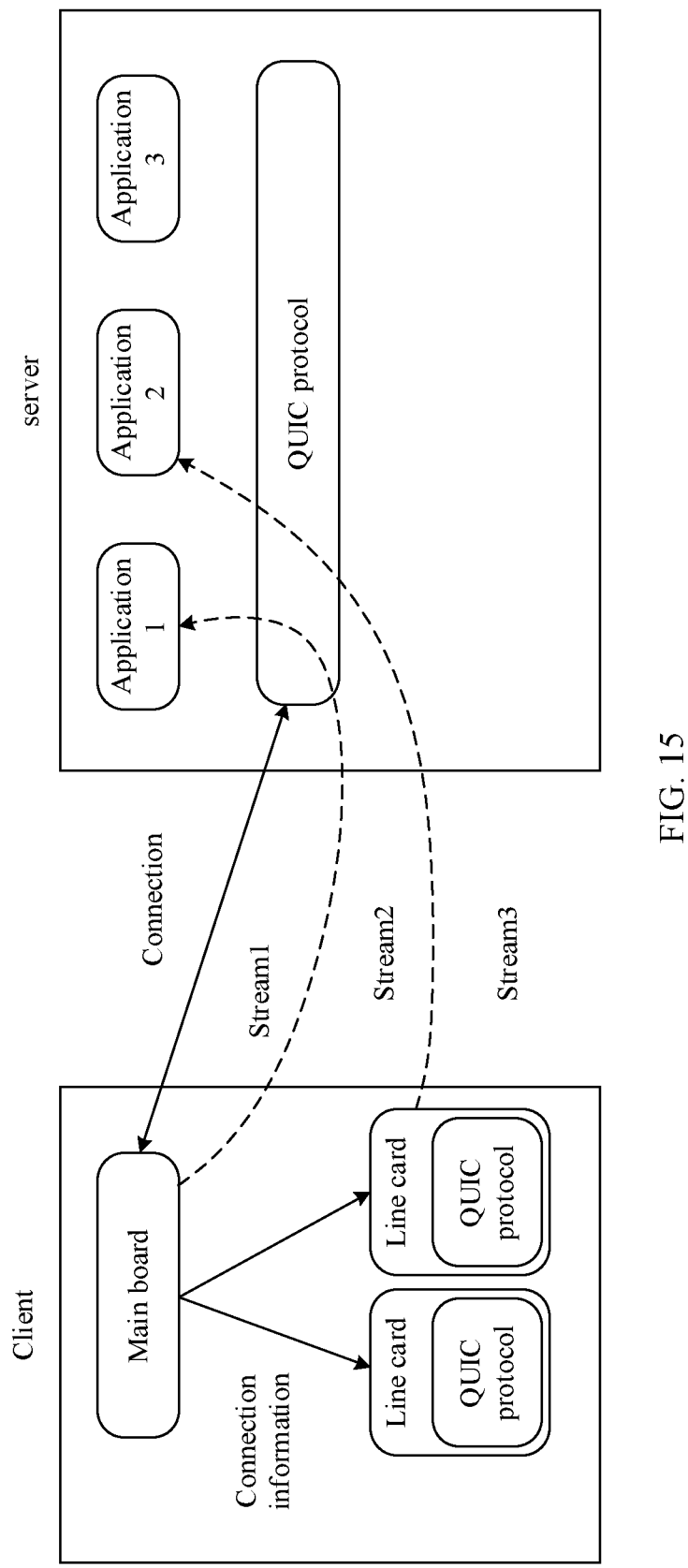
FIG. 15 is a schematic diagram of data transmission between a client and a server according to an example embodiment of this application.

In embodiments of this application, in the distributed system, deployment locations of the connection and the stream are separated, so that a connection does not need to be established for each apparatus in the distributed system. This reduces resource overheads of the distributed system, and achieves better transmission performance. For example, FIG. 15 is a schematic diagram of data transmission between a client and a server. In FIG. 15, the client uses an architecture of a distributed system, including a main board and two line cards. A QUIC protocol is separately run on the main board and the line cards. The server runs the QUIC protocol, and three applications (an application 1 to an application 3) are run above the QUIC protocol. The three applications simultaneously transmit data to the same client. Only one connection needs to be established between the client and the server in which the application 1 to the application 3 are located. Then, the main board transmits data to the server by using a stream 1 of the connection, and two line cards separately transmit data to the server by using a stream 2 and a stream 3 of the connection.

In addition, in the distributed system, a first apparatus and a second apparatus use a same transport protocol. This reduces complexity of using a plurality of transport protocols (that is, avoids complexity of a heterogeneous technology). Moreover, the first apparatus and the second apparatus transmit data by using different streams, so that reliability, security, flow control, and congestion control can be ensured.

It should be noted that the data transmission method in embodiments of this application is applicable to various distributed systems that are not limited to the distributed systems listed above.

The foregoing describes the method embodiments in embodiments of this application. The following describes data transmission apparatuses in embodiments of this application from a perspective of a logical function.

Figure 16:
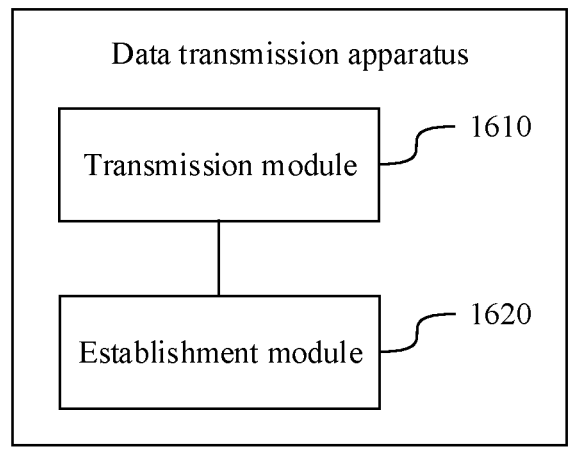
FIG. 16 is a schematic diagram of a structure of a data transmission apparatus according to an example embodiment of this application.

FIG. 16 is a diagram of a structure of a data transmission apparatus according to an example embodiment of this application. The apparatus may be implemented as a part or all of the apparatus by using software, hardware, or a combination thereof. The data transmission apparatus is applied to a first apparatus in a distributed system, and the distributed system includes the first apparatus and M second apparatuses. The data transmission apparatus provided in this embodiment of this application may implement the processes in FIG. 13 and FIG. 14 in embodiments of this application. The apparatus includes a transmission module 1610 and an establishment module 1620.

The transmission module 1610 is configured to send connection information of a target connection to each of N second apparatuses in the M second apparatuses, so that each of the N second apparatuses transmits data to a target end by using at least one stream of the target connection. The transmission module 1610 may be configured to implement the transmission function in step S1301 and perform an implicit step included in step S1301.

The target connection is a target transport protocol-based connection, the target connection is a connection established between the first apparatus and the target end, the connection information is used to indicate a parameter required for data transmission, both M and N are positive integers greater than or equal to 1, and N is less than or equal to M.

In a possible implementation, the establishment module 1620 is configured to initiate establishment of the target connection to the target end before the connection information of the target connection is sent to each of the N second apparatuses in the M second apparatuses.

In a possible implementation, a target transport protocol is a QUIC protocol.

In a possible implementation, the transmission module is further configured to send an application identity to each of the N second apparatuses, where the application identity is used to indicate each of the N second apparatuses to determine the to-be-transmitted data.

In a possible implementation, the transmission module 1610 is further configured to send an application identity corresponding to the at least one stream to the target end.

In a possible implementation, the at least one stream carries the application identity corresponding to the transmitted data.

In a possible implementation, the transmission module 1610 is further configured to transmit data to the target end based on the connection information by using a target stream of the target connection.

In a possible implementation, the at least one stream is different from the target stream, and the N second apparatuses use different streams.

In a possible implementation, the first apparatus and each of the N second apparatuses transmit data to the target end by using a same path; or at least two apparatuses in the distributed system transmit data to the target end by using different paths, where the at least two apparatuses belong to the first apparatus and the N second apparatuses.

In a possible implementation, the first apparatus and each of the N second apparatuses transmit data to the target end by using a same path, and the transmission module 1610 is further configured to receive a response packet sent by the target end, where the response packet is a packet returned by the target end based on a target data receiving status; and send, based on a stream identity in the response packet, the response packet to a second apparatus to which target data belongs.

Figure 17:
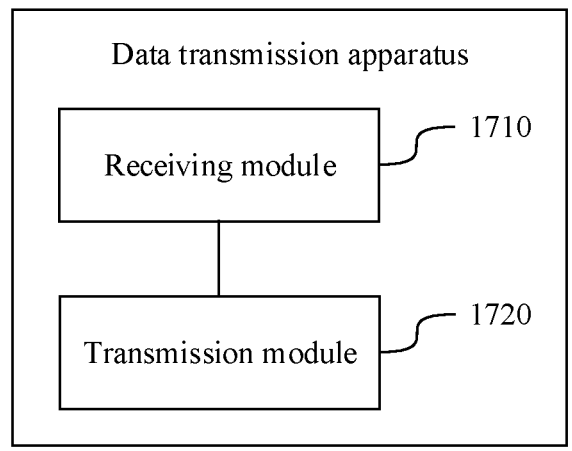
FIG. 17 is a schematic diagram of a structure of a data transmission apparatus according to an example embodiment of this application.

FIG. 17 is a diagram of a structure of a data transmission apparatus according to an example embodiment of this application. The apparatus may be implemented as a part or all of the apparatus by using software, hardware, or a combination thereof. The data transmission apparatus is applied to a second apparatus in a distributed system, and the distributed system includes the first apparatus and M second apparatuses. The data transmission apparatus provided in this embodiment of this application may implement the processes in FIG. 13 and FIG. 14 in embodiments of this application. The apparatus includes a receiving module 1710 and a transmission module 1720.

The receiving module 1710 is configured to receive connection information of a target connection that is sent by the first apparatus. The target connection is a target transport protocol-based connection, the target connection is a connection established between the first apparatus and a target end, and the connection information is used to indicate a parameter required for data transmission. The receiving module 1710 may be configured to implement the receiving function in step S1302 and perform an implicit step included in step S1302.

The transmission module 1720 is configured to transmit data to the target end based on the connection information by using a stream of the target connection. The at least one stream of the target connection is used by an apparatus that is in the distributed system and that receives the connection information to transmit data to the target end. The transmission module 1720 may be configured to implement the transmission function in step S1303 and perform an implicit step included in step S1303.

In a possible implementation, the transmission module 1720 is further configured to receive an application identity sent by the first apparatus; and determine the to-be-transmitted data based on the received application identity.

In a possible implementation, the transmission module 1720 is further configured to receive an identity range of the stream that is sent by the first apparatus; and determine a stream identity based on the identity range, where different streams correspond to different identity ranges, and the stream identity is carried in the stream.

Figure 18:
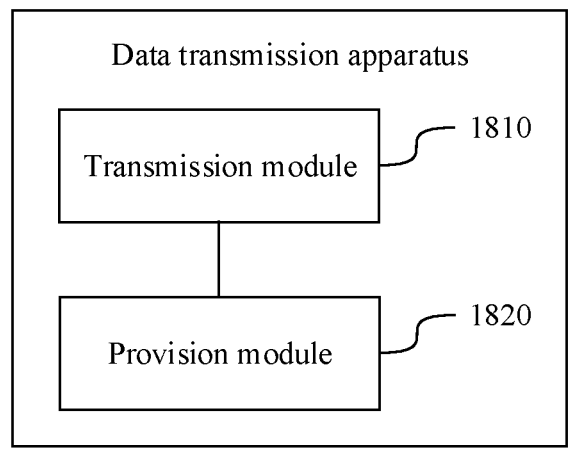
FIG. 18 is a schematic diagram of a structure of a data transmission apparatus according to an example embodiment of this application.

FIG. 18 is a diagram of a structure of a data transmission apparatus according to an example embodiment of this application. The apparatus may be implemented as a part or all of the apparatus by using software, hardware, or a combination thereof. The data transmission apparatus is applied to a target end to which a distributed system transmits data, and the distributed system includes the first apparatus and M second apparatuses. The data transmission apparatus provided in this embodiment of this application may implement the processes in FIG. 13 and FIG. 14 in embodiments of this application. The apparatus includes a transmission module 1810 and a provision module 1820.

The transmission module 1810 is configured to receive data transmitted by each of N second apparatuses in the M second apparatuses by using at least one stream of a target connection. Both M and N are positive integers greater than or equal to 1, N is less than or equal to M, the target connection is a target transport protocol-based connection, and the target connection is a connection established between the first apparatus and the target end. The transmission module 1810 may be configured to implement the transmission function in step S1304 and perform an implicit step included in step S1304.

The provision module 1820 is configured to provide the data for an application to which the data belongs. The provision module 1820 may be configured to implement the provision function in step S1305 and perform an implicit step included in step S1305.

Figure 19:
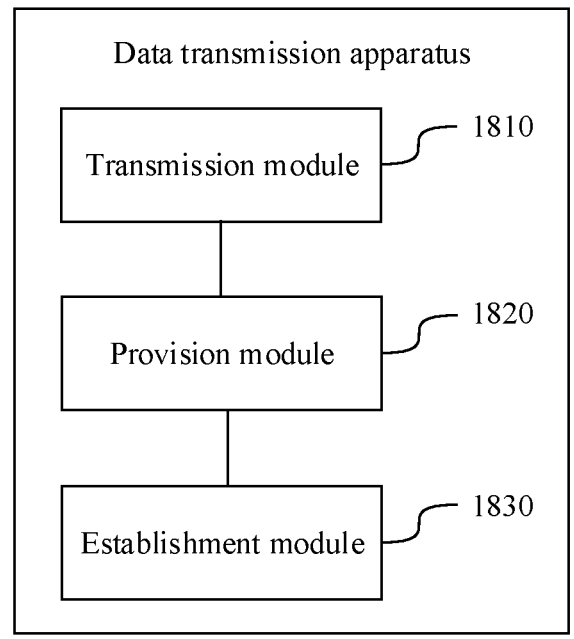
FIG. 19 is a schematic diagram of a structure of a data transmission apparatus according to an example embodiment of this application.

In a possible implementation, as shown in FIG. 19, the data transmission apparatus further includes an establishment module 1830, configured to establish the target connection to the first apparatus based on a connection request initiated by the first apparatus for the target connection; or initiate establishment of the target connection to the first apparatus.

In a possible implementation, the establishment module 1830 is further configured to establish a binding relationship between an application of the target end and each of an IP address and a UDP port of the target end, where the IP address and the UDP port of the target end are used to establish the target connection to the first apparatus, and the provision module 1820 is further configured to provide, for the application to which the data belongs based on the IP address and the UDP port, the data sent by each of the N second apparatuses.

In a possible implementation, different applications of the target end correspond to different application identities, and the provision module 1820 is configured to provide, for the application to which the data belongs based on an application identity corresponding to the data sent by each of the N second apparatuses, the data sent by each of the N second apparatuses.

In embodiments of this application, division into the modules of the data transmission apparatus is an example and is merely logical function division, and there may be another division during actual implementation. In addition, the function modules in embodiments of this application may be integrated into one processor, or each of the modules may exist alone physically, or two or more modules may be integrated into one module. The integrated module may be implemented in a form of hardware, or may be implemented in a form of a software function module.

When the integrated module is implemented in the form of the software function module and sold or used as an independent product, the integrated module may be stored in a computer-readable storage medium. Based on such an understanding, the technical solutions of this application essentially, or the part contributing to the conventional technology, or all or some of the technical solutions may be implemented in the form of a software product. The computer software product is stored in a storage medium and includes several instructions for indicating a computer device (which may be a personal computer, a server, or a network device) to perform all or some of the steps of the method described in embodiments of this application. The foregoing storage medium includes any medium that can store program code, such as a USB flash drive, a removable hard disk, a read-only memory (ROM), a random-access memory (RAM), a magnetic disk, or an optical disc.

Figure 20:
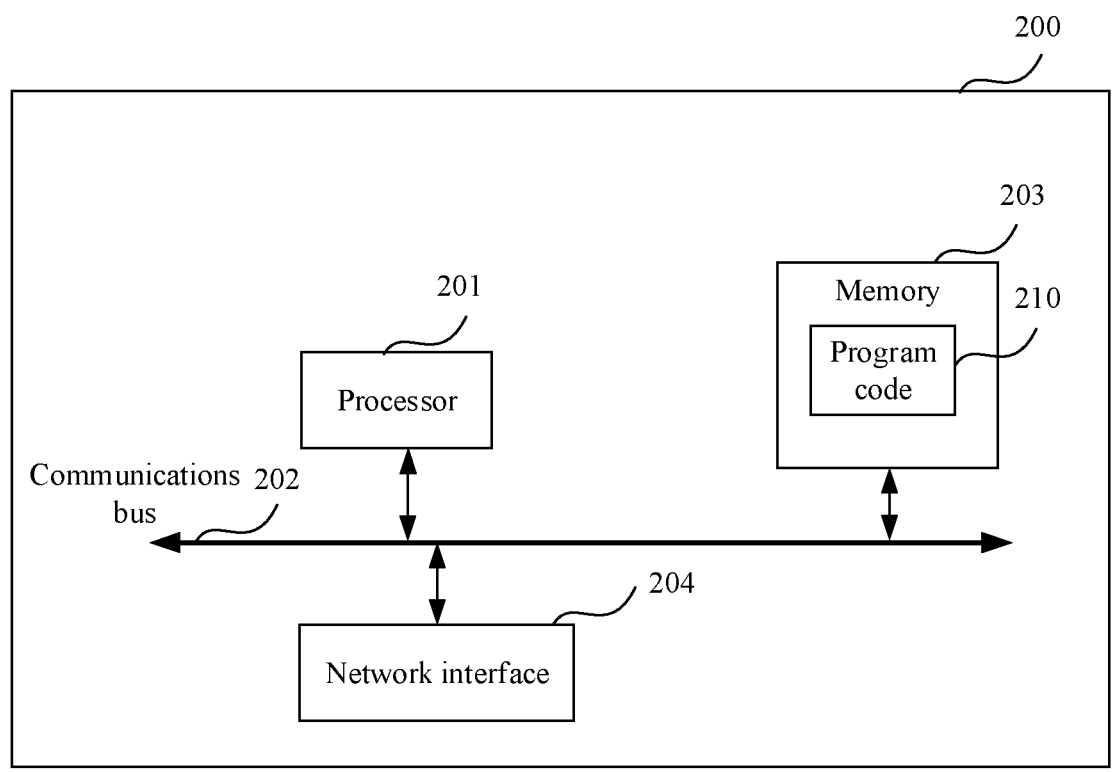
FIG. 20 is a schematic diagram of a structure of a device according to an example embodiment of this application.

FIG. 20 is a schematic diagram of a structure of a device 200 according to an embodiment of this application.

Optionally, with reference to FIG. 4, the device 200 shown in FIG. 20 is optionally the network device 400 in FIG. 4. With reference to FIG. 5, the device 200 shown in FIG. 20 is a subscriber frame. With reference to FIG. 6, the device 200 shown in FIG. 2 is a switch. With reference to FIG. 7 and FIG. 8, the device 200 shown in FIG. 20 is a device on which an operating system runs.

The device 200 is optionally implemented by a general bus architecture. The device 200 includes at least one processor 201, a communications bus 202, a memory 203, and at least one network interface 204.

The processor 201 is, for example, a general-purpose CPU, a network processor (NP), a graphics processing unit (GPU), a neural-network processing unit (NPU), a data processing unit (DPU), a microprocessor, or one or more integrated circuits configured to implement the solutions of this application. For example, the processor 201 includes an application-specific integrated circuit (ASIC), a programmable logic device (PLD), or a combination thereof. The PLD is, for example, a complex programmable logic device (CPLD), a field-programmable gate array (FPGA), generic array logic (GAL), or any combination thereof.

The communications bus 202 is used to transmit information between the foregoing components. The communications bus 202 may be classified into an address bus, a data bus, a control bus, or the like. For ease of representation, only one thick line is used to represent the bus 202 in FIG. 20, but this does not mean that there is only one bus or only one type of bus.

The memory 203 may be, for example, a ROM or another type of static storage device that can store static information and instructions, or may be a RAM or another type of dynamic storage device that can store information and instructions, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray optical disc, and the like), a magnetic disk storage medium or another magnetic storage device, or any other medium that can be used to carry or store expected program code in a form of an instruction or a data structure and that can be accessed by a computer, but is not limited to this. For example, the memory 203 exists independently, and is connected to the processor 201 through the communications bus 202. The memory 203 may alternatively be integrated into the processor 201.

The network interface 204 is configured to communicate with another device or a communications network by using any apparatus such as a transceiver. The network interface 204 includes a wired network interface, and may further include a wireless network interface. The wired network interface may be, for example, an Ethernet interface. The Ethernet interface may be an optical interface, an electrical interface, or a combination thereof. The wireless network interface may be a Wireless Local Area Network (WLAN) interface, a cellular network interface, a combination thereof, or the like.

During an implementation, in an embodiment, the processor 201 may include one or more CPUs.

During an implementation, in an embodiment, the device 200 may include a plurality of processors. Each of the processors may be a single-core processor (single-CPU) or a multi-core processor (multi-CPU). The processor herein may be one or more devices, circuits, and/or processing cores configured to process data (for example, computer program instructions).

In some embodiments, the memory 203 is configured to store program code 210 for executing the solutions of this application, and the processor 201 may execute the program code 210 stored in the memory 203. In other words, the device 200 may implement the data transmission method provided in the method embodiments by using the processor 201 and the program code 210 in the memory 203.

Embodiments in this specification are all described in a progressive manner. Same or similar parts in the embodiments may be mutually referenced. Each embodiment focuses on a difference from other embodiments.

In the specification and claims of embodiments of this application, the terms "first", "second", and the like are intended to distinguish between different objects, but are not intended to indicate a particular order of the objects and shall not be understood as indicating or implying relative importance. For example, a first apparatus and a second apparatus are configured to distinguish between different apparatuses, but are not used to describe specific apparatuses.

In embodiments of this application, unless otherwise specified, "at least one" means one or more, and "a plurality of" means two or more.

All or some of the foregoing embodiments may be implemented by using software, hardware, firmware, or any combination thereof. When the software is used for implementation, all or some of the embodiments may be implemented in a form of a computer program product. The computer program product includes one or more computer instructions. When the computer program instructions are loaded and executed on a computer, all or some of the procedures or functions described in embodiments of this application are generated. The computer may be a general-purpose computer, a special-purpose computer, a computer network, or another programmable apparatus. The computer indications may be stored in a computer-readable storage medium or may be transmitted from a computer-readable storage medium to another computer-readable storage medium. For example, the computer indications may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disk (DVD)), a semiconductor medium (for example, a solid-state drive (SSD)), or the like.

The foregoing embodiments are merely intended for describing the technical solutions of this application, rather than limiting this application. Although this application is described in detail with reference to the foregoing embodiments, a person of ordinary skill in the art should understand that they may still make modifications to the technical solutions described in the foregoing embodiments or make equivalent replacements to some technical features thereof, without departing from the scope of the technical solutions of the embodiments of this application.

What is claimed is:

1. A first apparatus in a distributed system, wherein the distributed system comprises the first apparatus and M second apparatuses, wherein the first apparatus comprises:
a processor;
a memory coupled to the processor and configured to store programming instructions that, when executed by the processor, cause the network device to be configured to:
establish a target connection to a target end external to the distributed system, wherein the target connection is a target transport protocol-based connection;
send an identity range of at least one stream to each of N second apparatuses of the M second apparatuses;
send connection information of the target connection to each of the N second apparatuses to enable each of the N second apparatuses to determine a stream identity based on the identity range and transmit data to the target end using the at least one stream of the target connection,
wherein different streams correspond to different identity ranges,
wherein the stream identity is carried in the at least one stream,
wherein the connection information indicates a parameter for data transmission,
wherein M and N are positive integers greater than or equal to 1, and
wherein N is less than or equal to M.

2. The first apparatus of claim 1, wherein the programming instructions, when executed by the processor, further cause the first apparatus to be configured to initiate establishment of the target connection to the target end.

3. The first apparatus of claim 1, wherein a target transport protocol of the target transport protocol-based connection is a QUIC protocol.

4. The first apparatus of claim 1, wherein the programming instructions, when executed by the processor, further cause the first apparatus to be configured to send an application identity to each of the N second apparatuses, wherein the application identity instructs each of the N second apparatuses to determine to-be-transmitted data.

5. The first apparatus of claim 1, wherein the programming instructions, when executed by the processor, further cause the first apparatus to be configured to send an application identity corresponding to the at least one stream to the target end.

6. The first apparatus of claim 1, wherein the at least one stream carries an application identity corresponding to transmitted data to the target end.

7. The first apparatus of claim 1, wherein the programming instructions, when executed by the processor, further cause the first apparatus to be configured to transmit, based on the connection information, data to the target end using a target stream of the target connection.

8. The first apparatus of claim 7, wherein the at least one stream is different from the target stream, and wherein each of the N second apparatuses uses a different stream of the at least one stream.

9. The first apparatus of claim 1, wherein the first apparatus and each of the N second apparatuses have a same data path to the target end or at least two apparatuses have different data paths to the target end, wherein the at least two apparatuses are from the first apparatus and the N second apparatuses.

10. The first apparatus of claim 1, wherein the programming instructions, when executed by the processor, further cause the first apparatus to be configured to:
receive a response packet from the target end, wherein the response packet is based on a target data receiving status; and
send, based on a stream identity in the response packet, the response packet to a second apparatus to which target data belongs.

11. A second apparatus in a distributed system, wherein the distributed system comprises a first apparatus and the second apparatus, and wherein the second apparatus comprises:
a processor;
a memory coupled to the processor and configured to store programming instructions that, when executed by the processor, cause the network device to be configured to:
receive connection information of a target connection from the first apparatus, wherein the target connection is a target transport protocol-based connection, wherein the target connection is between the first apparatus and a target end external to the distributed system, and wherein the connection information indicates a parameter for data transmission using at least one stream;
receive an identity range of the at least one stream from the first apparatus;
determine a stream identity based on the identity range, wherein different streams correspond to different identity ranges, and wherein the stream identity is carried in the at least one stream; and
transmit data to the target end based on the connection information and using the at least one stream.

12. The second apparatus of claim 11, wherein the programming instructions, when executed by the processor, further cause the second apparatus to be configured to:
receive, from the first apparatus, an application identity; and
determine to-be-transmitted data based on the application identity.

13. A data transmission method applied to a distributed system, wherein the distributed system comprises a first apparatus and M second apparatuses, and wherein the data transmission method comprises:
sending, by the first apparatus, connection information of a target connection to each of N second apparatuses in the M second apparatuses, wherein the target connection is a target transport protocol-based connection, wherein the target connection is between the first apparatus and a target end external to the distributed system, wherein the connection information indicates a parameter for data transmission, wherein M and N are positive integers greater than or equal to 1, and wherein N is less than or equal to M;
sending, by the first apparatus, an identity range of at least one stream to each of the N second apparatuses;
determining, by each of the N second apparatuses, a stream identity based on the identity range, wherein different streams correspond to different identity ranges, and wherein the stream identity is carried in the at least one stream; and transmitting, by each of the N second apparatuses, data to the target end based on the connection information and using the at least one stream of the target connection.

14. The data transmission method of claim 13, before the sending, the data transmission method further comprises initiating, by the first apparatus, establishment of the target connection to the target end.

15. The data transmission method of claim 13, wherein the target transport protocol is a QUIC protocol.

16. The data transmission method of claim 13, further comprising sending, by the first apparatus, an application identity to each of the N second apparatuses, wherein the application identity instructs each of the N second apparatuses to determine to-be-transmitted data.

17. The data transmission method of claim 13, further comprising sending, by the first apparatus, an application identity corresponding to the at least one stream to the target end.

18. The data transmission method of claim 13, wherein the at least one stream carries an application identity corresponding to transmitted data to the target end.

19. The data transmission method of claim 13, further comprising transmitting, by the first apparatus, data to the target end based on the connection information and using a target stream of the target connection.

* * * * *